US012749365B2

(12) United States Patent
Horton

(10) Patent No.: US 12,749,365 B2
(45) Date of Patent: Sep. 29, 2026

(54) SECURITY SCREENING DEVICE AND SYSTEMS AND METHODS OF USING THE SAME

(71) Applicant: Cardiac Innovation, LLC, Austin, TX (US)

(72) Inventor: Rodney Paul Horton, Austin, TX (US)

(73) Assignee: CARDIAC INNOVATION, LLC, Austin, TX (US)

( * ) Notice: Subject to any disclaimer, the term of this patent is extended or adjusted under 35 U.S.C. 154(b) by 86 days.

(21) Appl. No.: 18/628,228

(22) Filed: Apr. 5, 2024

(65) Prior Publication Data

US 2024/0338986 A1 Oct. 10, 2024

Related U.S. Application Data

(60) Provisional application No. 63/494,386, filed on Apr. 5, 2023.

(51) Int. Cl.
*G07C 9/26* (2020.01)
*G01V 5/20* (2024.01)
*G07C 9/27* (2020.01)

(52) U.S. Cl.
CPC ................. *G07C 9/26* (2020.01); *G01V 5/20* (2024.01); *G07C 9/27* (2020.01)

(58) Field of Classification Search
CPC .............. G07C 9/26; G07C 9/27; A61B 5/076
See application file for complete search history.

(56) References Cited

U.S. PATENT DOCUMENTS

| | | | | |
|---|---|---|---|---|
| 9,630,017 | B1 * | 4/2017 | Buchheit | G16H 40/63 |
| 2008/0004663 | A1 * | 1/2008 | Jorgenson | A61N 1/3904 607/32 |
| 2013/0027180 | A1 * | 1/2013 | Lakamraju | G07C 9/257 340/5.52 |
| 2014/0019076 | A1 * | 1/2014 | Horton | G16Z 99/00 702/66 |
| 2016/0321846 | A1 * | 11/2016 | Pham | G07C 9/20 |
| 2019/0043291 | A1 * | 2/2019 | Westby | G07C 9/00309 |

* cited by examiner

*Primary Examiner* — Nabil H Syed
(74) *Attorney, Agent, or Firm* — Ballard Spahr LLP

(57) ABSTRACT

A security screening system having a secured area and a security screening subsystem. The security screening subsystem having a medical device identifier, a computing device, and a database. The medical device identifier is configured to provide an output indicative of identifying information associated with an implanted medical device of an individual seeking entry into the secured area. The computing device is configured to receive the output from the medical device identifier. The database stores information associated with a plurality of registered medical devices. The computing device is in communication with the database and is configured to determine if the identifying information associated with the medical device corresponds to a registered medical device among the plurality of registered medical devices.

15 Claims, 21 Drawing Sheets

MANUFACTURER C INITIATION SIGNAL

SECURITY SCREENING DEVICE AND SYSTEMS AND METHODS OF USING THE SAME

CROSS REFERENCE TO RELATED APPLICATION

This application is based upon and claims benefit of priority to U.S. Provisional Application No. 63/494,386, file Apr. 5, 2023, and hereby incorporated by reference herein in its entirety.

FIELD

Disclosed herein is a security screening system that may use a medical device identifier to (a) identify an implanted medical device of an individual requesting access into a secured arca and/or (b) determine whether the identity of the implanted medical device corresponds to a registered medical device from a list of registered medical devices.

BACKGROUND

Security checkpoint wait times to access a secured area, such as an airport, a stadium, an arena, a theatre, an amusement park, a secured facility, an entertainment venue, or a public event space, may be inconvenient, overwhelming, and extremely long (up to or exceeding 120 minutes) causing individuals requesting access to the secured area to miss flights or at least parts of events. For individuals with a medical implant device, such as a cardiac implant, for example a pacemaker, the wait times and/or security screening times may be even longer. Security personnel may need to perform advanced imaging, such as X-rays, on individuals to identify and confirm the individual's implanted medical device is a registered implanted medical device and does not pose a security threat. This process may be time consuming, expensive, and intrusive. With approximately 71,000 airports and stadiums world-wide, approximately $107 billion dollars spent on homeland security/public safety, and approximately $2.6 billion dollars spent on global X-ray security, there is a need for a security screening system that is fast, easy, less expensive, and less intrusive than existing security screening systems used to identify implanted medical devices.

SUMMARY

Described herein, in various aspects, is a security screening system. The security screening system may have a secured area and a security screening subsystem. The security screening subsystem may have a medical device identifier, a computing device, and a database. The medical device identifier may be positioned at or within the secured area. The medical device identifier may be configured to provide an output indicative of identifying information (optionally, an identity) associated with an implanted medical device of an individual seeking entry into the secured area. The computing device may be configured to receive the output from the medical device identifier. The database may store information associated with a plurality of registered medical devices. The computing device of the security screening subsystem may be in communication with the database. The computing device may be configured to determine if the identifying information (e.g., identity) of the medical device corresponds to a registered medical device among the plurality of registered medical devices and provide an output indicative of the determination of whether the identifying information (e.g., identity) of the medical device corresponds to a registered medical device. Methods of performing a security screening or using the security screening system are also described.

Various aspects of a security device are also described herein. The security device may comprise a metal detector and a medical device identifier. The metal detector may be configured to identify a nearby presence of a metallic material. The metal detector may be configured to provide an output indicative of the nearby presence of the metallic material. The medical device identifier may be configured to provide an output indicative of identifying information (e.g., an identity) associated with an implanted medical device of an individual seeking entry into a secured area.

Various aspects of a medical device are also described herein. The medical device may comprise a defibrillator and a medical device identifier. The defibrillator may be configured to deliver electrical current to an individual's heart. The medical device identifier may be configured to provide an output indicative of identifying information (e.g., an identity) associated with an implanted medical device of the individual.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms “a”, “an”, and “the” include plural referents unless the context clearly dictates otherwise. For example, use of the term “a signal” may refer to one or more of such signals unless the context indicates otherwise.

All technical and scientific terms used herein have the same meaning as commonly understood to one of ordinary skill in the art to which this invention belongs unless clearly indicated otherwise.

Ranges may be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect. It will be further understood that the endpoints of each of the ranges are significant both in relation to the other endpoint, and independently of the other endpoint.

As used herein, the terms “optional” or “optionally” mean that the subsequently described event or circumstance may or may not occur, and that the description includes instances where said event or circumstance occurs and instances where it does not.

Figure 1:
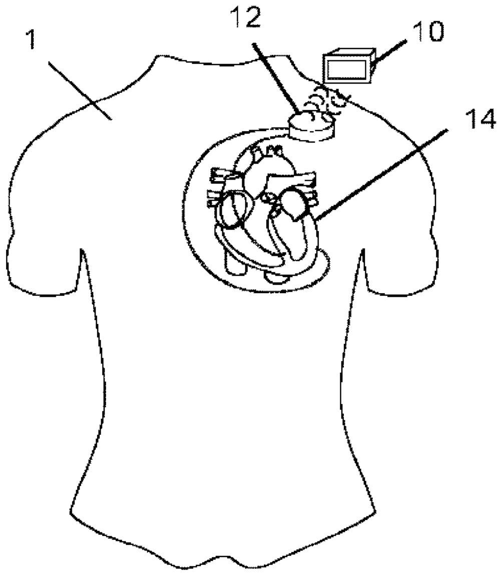
FIG. 1 illustrates an example use of a medical device identifier according to embodiments of the invention.

FIG. 1 illustrates an example use of a medical device identifier 10 according to embodiments of the invention. Medical device identifier 10 is shown close to but not necessarily touching the body of an individual 1 who has in implanted medical device 12. Implanted medical device 12 may be, for example, a pacemaker that regulates the heart 14 of the individual 1. While the invention will be described primarily in the context of identifying a pacemaker, it is to be understood that the invention is not so limited, and embodiments may be used to identify other kinds of devices. A pacemaker is typically placed just under the skin. Medical device identifier 10 transmits varying or steady signals according to one or more predetermined protocols, and interprets any electromagnetic signals returned from implanted device 12 (an exemplary form of identifying information as further disclosed herein) to identify the implanted device 12. Because each manufacturer uses a different protocol, the manufacturer of the device can be uniquely determined from the returned signals (identifying information). For example, medical device identifier 10 may try possible manufacturers' protocols one by one until the implanted medical device responds with a returned signal. Medical device identifier 10 may then also analyze the returned signal to further verify the identification.

The medical device identifier 10 does not program or otherwise change the operation of implanted medical device 12, but simply gathers enough information about the device, based on the return signals, to identify the manufacturer or other provider of the device. In other embodiments, more detailed information may be ascertained, such as a model number of the device or other information. Because no programming is performed, there is no risk to the individual 1.

Figure 2:
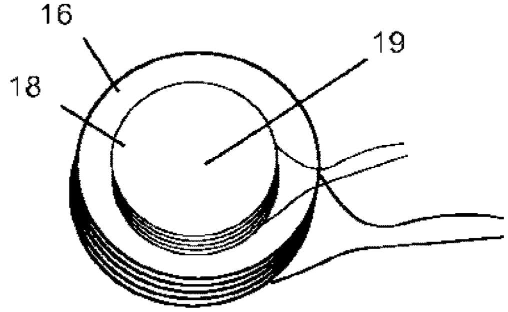
FIG. 2 illustrates a coil arrangement usable in embodiments of the invention.

FIG. 2 illustrates a coil arrangement usable in embodiments of the invention. A primary coil 16 can be used in an active mode to generate electromagnetic signals, or in a passive mode to receive electromagnetic signals. When a current is passed through coil 16, coil 16 generates a magnetic field. If the current is time-varying, the magnetic field is also time-varying in accordance with the current waveform. In the passive mode, electromagnetic fields interacting with coil 16 generate currents within coil 16. Information about the magnetic fields can be inferred from the characteristics of the induced current. Primary coil 16 may be, for example, between 2 and 20 cm in diameter, and have between 10 and 300 turns of wire, although coils having other sizes and numbers of turns may be used in some embodiments. In one embodiment, coil 16 has a diameter of about 6.3 cm, a height of about 1.5 cm, a resistance of 0.1 ohms, and includes 16 turns of 20 gauge wire.

A secondary coil 18 may be used to generate steady (DC) magnetic fields by passing a DC current through secondary coil 18. A ferromagnetic or ferrimagnetic core 19 may be present within secondary coil 18, to enhance the strength of magnetic fields generated by secondary coil 18. Secondary coil 18 may have any suitable size, number of turns, and resistance. In one embodiment, secondary coil 18 has about 291 turns of 25 gauge wire, a diameter of about 6 cm, a height of about 1.8 cm, and a resistance of about 4.7 ohms. Other coils usable in embodiments include low profile solenoids having built-in ferromagnetic cores as are well-known in the art. In some embodiments, a permanent magnet may be provided for generating DC magnetic fields.

Figure 3:
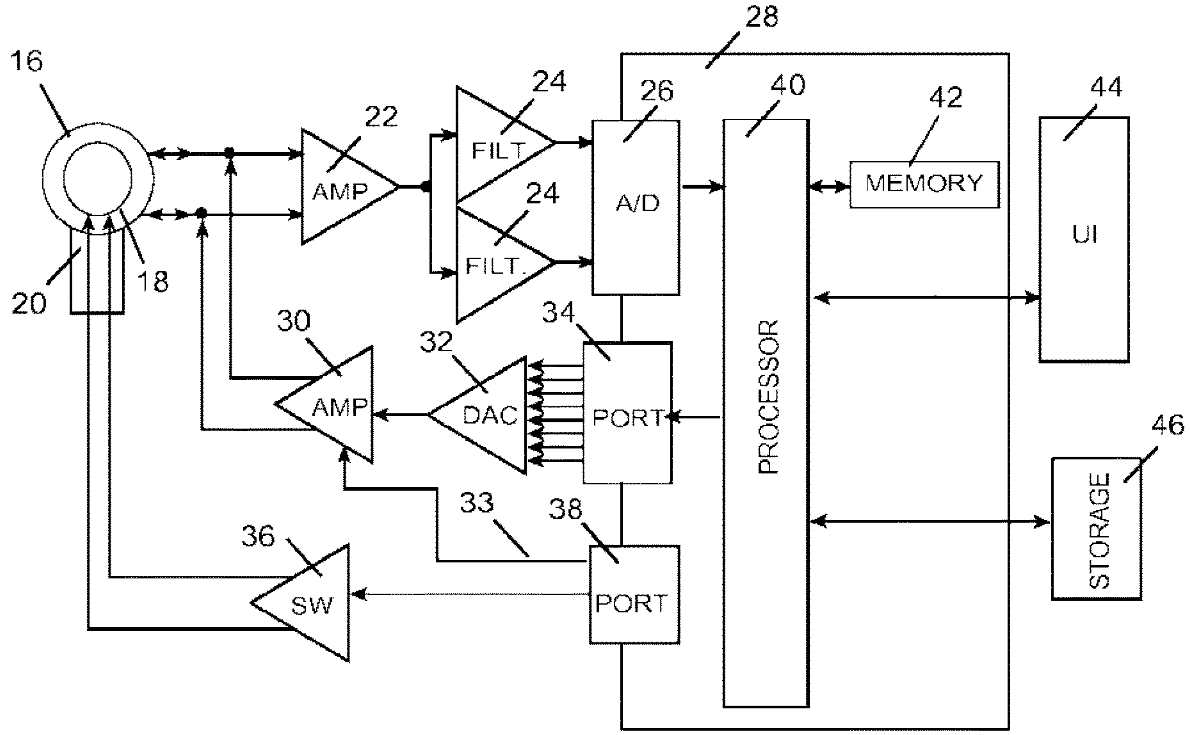
FIG. 3 shows a simplified block diagram of one example electronic architecture of the medical device identifier of FIG. 1.

FIG. 3 shows a simplified block diagram of one example electronic architecture of medical device identifier 10. A computer subsystem 28 includes a processor 40 and memory 42. Processor 40 may be any suitable microprocessor, microcontroller, digital signal processor, or other circuitry capable of performing the processor function. Preferably, computer subsystem 28 is capable of at least 500 kHz sampling of waveforms.

Memory 42 may include multiple kinds of memory, for example random access memory (RAM), read only memory (ROM), flash memory, and other kinds of memory, in any suitable combination. For example, memory 42 may include nonvolatile memory such as ROM or flash memory for storing instructions executed by processor 40 in performing the functions of medical device identifier 10. A number of digitized waveforms may be stored in nonvolatile memory, as is explained in more detail below. Memory 42 may include RAM used by processor 40 for temporary variable storage. While only one block is indicated for memory 42, different kinds of memory 42 may reside in different locations. For example RAM may be integrated into processor 40. Many different architectures are possible. Additional storage 46 may be provided, and may include removable storage such as a flash memory card for storing information for transfer to another computer system, allowing for diagnostics, evaluation, and improved operation.

A user interface 44 may be provided for presenting results to a user of medical device identifier 10, for accepting inputs from the user, and other functions. For example, user interface 44 may include a display such as a liquid crystal display on which results can be presented, and may also include various switches, buttons, keypads, or other input devices with which the user can direct the operation of medical device identifier 10. A touchscreen could be used, providing both display and user input capabilities in a single device.

A digital-to-analog converter (DAC) 32 is coupled to processor 40 via an output port 34. DAC 32 converts digital values supplied by processor 40 to analog voltages. Any suitable DAC may be used, for example a 6-bit converter made using a simple network of resistors. The output of DAC 32 is provided to drive circuitry, which in turn is used to drive primary coil 16 in its active mode to generate electromagnetic waveforms. In the example of FIG. 3, the drive circuitry includes a voltage-to-current amplifier 30. Coil 16 is switchable between active and passive modes by enabling and disabling amplifier 30. Processor 40 provides, via port 38, a digital signal 33 that enables and disables amplifier 30 depending on the true or false state of signal 33. When amplifier 30 is enabled, it drives current through coil 16 in accordance with the output of DAC 32. When amplifier 30 is disabled, coil 16 may be used in its passive mode.

In the passive mode, coil 16 is used to sense any electromagnetic signals returned from implanted medical device 12. As currents are induced in coil 16, a voltage appears on the leads of coil 16, corresponding to the electromagnetic signal. The leads of coil 16 are connected to receiver circuitry for reading the voltage signal. In the example of FIG. 3, the receiver circuitry includes an instrumentation amplifier 22 and filters 24. In one embodiment, instrumentation amplifier 22 is a Field Effect Transistor (FET)-Input instrumentation amplifier as is known in the art. Such an instrumentation amplifier can optionally be configured with a gain of 100.

Two different filters 24 may be provided, so that signals having different characteristics can be accommodated. For example, some implanted devices may emit electromagnetic signals that are stronger or weaker than those emitted by implanted devices from different manufacturers. The two filters may be configured with different gains, so that weak signals can be detected using a detection channel with a higher gain. In one embodiment, both filters 24 are low-pass Butterworth filters, but one of the filters is configured for unity gain, while the other is configured with a gain of 10. The two filters 24 may have different frequency cutoff characteristics as well. Thus, in combination with instrumentation amplifier 22, two reading channels are available, having gains of 100 and 1000 respectively. Filters 24 may also introduce a voltage offset, so that the expected range of voltages sensed from coil 16 does not include negative voltages after the offset is introduced. In one embodiment, an offset of 1.5 volts is used. Other embodiments may use different gains, offsets, or filter types than these examples.

The receiver circuitry may also include an analog-to-digital converter (ADC) 26. In the example of FIG. 3, the outputs of filters 24 are provided to ADC 26, which converts the voltages to digital values. Processor 40 can thus obtain a digital number representing the voltage delivered to ADC 26 by either of filters 24. It is also possible for processor 40 to sense both channels. Any suitable ADC may be used. In some aspects, the ADC can be a 10-bit ADC that is configured for work with multi-channel systems.

A high current switch 36 is also provided, for driving secondary coil 18. Switch 36 is also controlled by processor 40 through port 38. One example of a device from which a suitable switch may be constructed is a Power MOSFET, such as those manufactured by ST MICROELECTRONICS. Processor 40 can thus selectively cause current to pass through secondary coil 18 to generate a constant magnetic field. It is also possible to generate a DC magnetic field by driving DC current through primary coil 16.

Figure 4A:
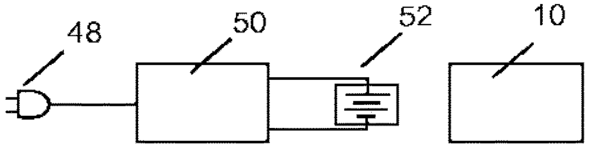
FIGS. 4A and 4B illustrate the usage of a battery in the medical device identifier of FIG. 1.
Figure 4B:
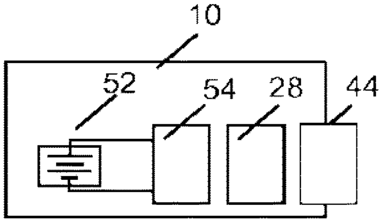

Medical device identifier 10 may include a battery (not shown in FIG. 3), for convenient operation without being connected to mains power. In some embodiments, medical device identifier may be configured so that it will not operate while connected to the mains for safety reasons. FIG. 4A shows the system while battery 52 is being charged by a charging circuit 50. During charging mode, charging circuit 50 is plugged into an AC outlet 48 and medical device identifier 10 is off. In run mode, as shown in FIG. 4B, the electronics 54 of medical device identifier 10 are powered by battery 52, and the unit is not plugged into the AC outlet, so that medical device identifier 10 is handheld and portable.

Any suitable battery arrangement may be used. On example arrangement uses two lithium-ion battery packs to create positive and negative voltage supplies. For example, it is contemplated that two Li-Ion 7.4V 2200 mAh battery packs can create a +7.4 V and −7.4 V supply. A third Lithium-Ion battery (e.g., a 3.7 V Li-Ion battery) can be used to run the microcontroller in sleep mode allowing it to maintain time and date. Linear regulators produce the voltage (e.g., +5 V) needed for the display and the voltage (e.g., 3.3 V) needed for the microcontroller.

In operation, medical device identifier 10 generates electromagnetic signals that mimic those sent by various programmers, in an attempt to "wake up" implanted medical device 12, and monitors any signals returned from implanted medical device 12. The returned signals may be tested to see if they match signals known to be transmitted by a manufacturer's device, and the device identification may be based on which manufacturer's known signals match most closely with the signals returned from the device.

Figure 6A:
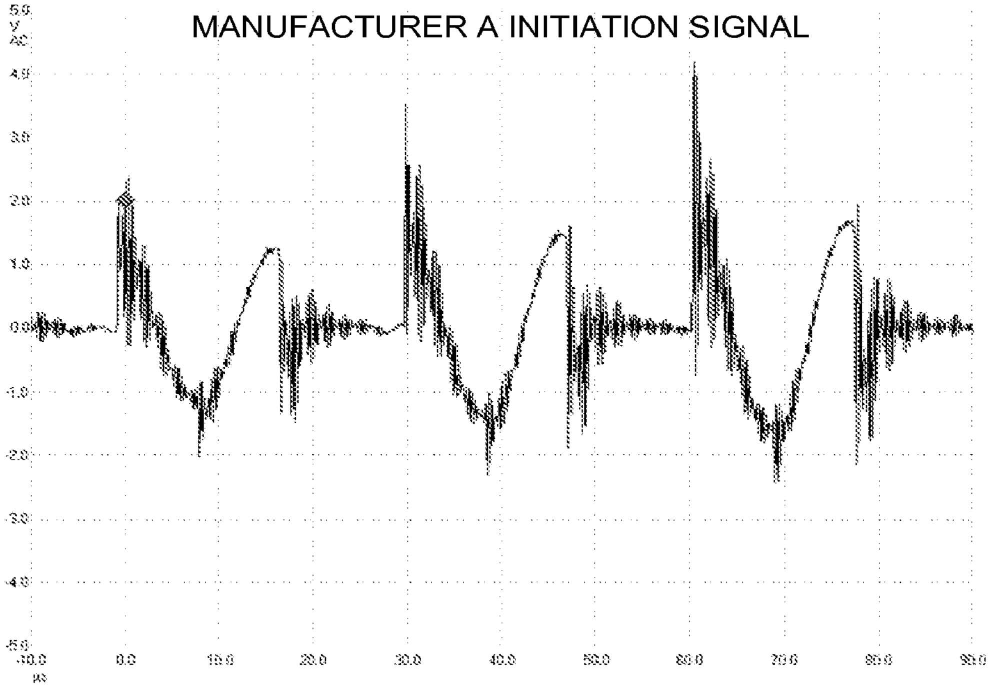
FIG. 6A illustrates a digital recording of an electromagnetic signal generated by a first manufacturer's programming device.

FIG. 6A illustrates a digital recording of an electromagnetic signal generated by a first manufacturers (Manufacturer A) programming device when it is initiating communication with an implanted medical device from Manufacturer A. The waveform of FIG. 6A has a particular pattern and amplitude unique to Manufacturer A. Medical device identifier 10 (or a computing device in communication with medical device identifier 10) stores a digital representation of this waveform for use in attempting to interact with devices from Manufacturer A. This digital representation may be called a digitized waveform, and is a sequence of numerical values representing the waveform amplitude at respective sample times. Other digitized waveforms are also stored, which are representations of the signals used by other manufacturers programmers to initiate communication with their respective devices.

Figure 6B:
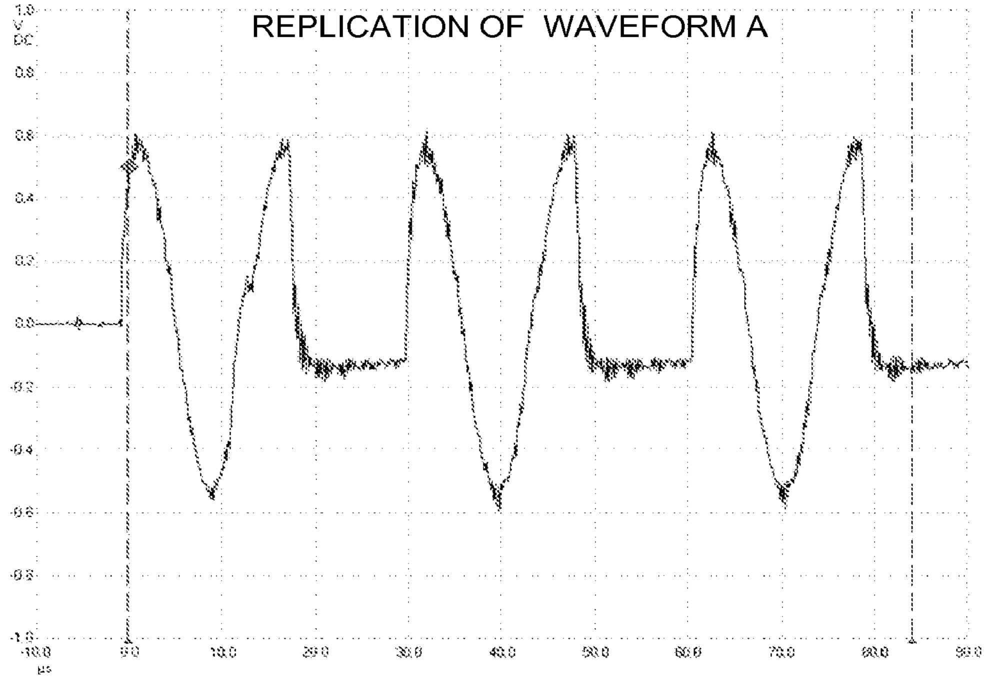
FIG. 6B is a graphical illustration of a replication of the waveform of FIG. 6A, as emitted by an embodiment of the invention.

To generate the electromagnetic signals replicating the waveform of FIG. 6A, processor 40 retrieves the corresponding digitized waveform from memory and provides the numerical values in order and with the proper timing to DAC 32, with amplifier 30 enabled so that coil 16 is in its active mode. Coil 16 thus produces electromagnetic signals very similar to those produced by the Manufacturer A's programming device. FIG. 6B shows a recording of an electromagnetic signal generated in this way by an embodiment of the invention, replicating the signal of FIG. 6A.

To receive a signal returned from implanted medical device 12, processor 40 switches coil 16 into the passive mode, and begins taking readings using the appropriate filter 24 through ADC 26. Readings are taken rapidly enough to characterize the expected signals. It is believed that any sampling rate of 350 kHz or higher is sufficient for all current pacemakers, and the data in many of the figures was taken with a sampling rate of 497.777 kHz, but any workable sampling rate may be used.

Figure 6C:
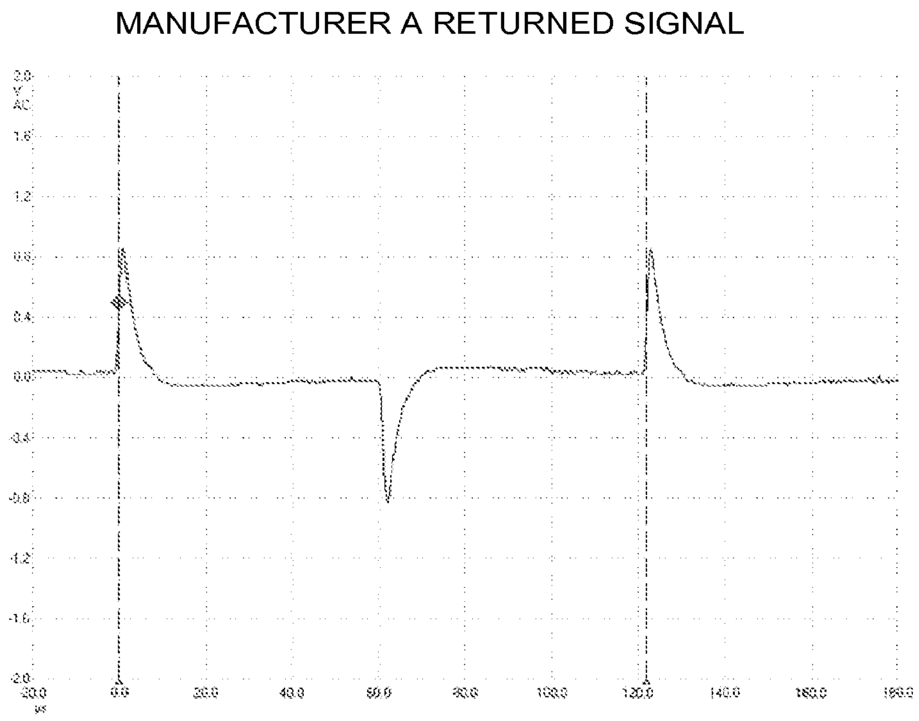
FIG. 6C illustrates a digital recording of an electromagnetic signal returned by a device made by the first manufacturer when communication is successfully initiated.
Figure 6D:
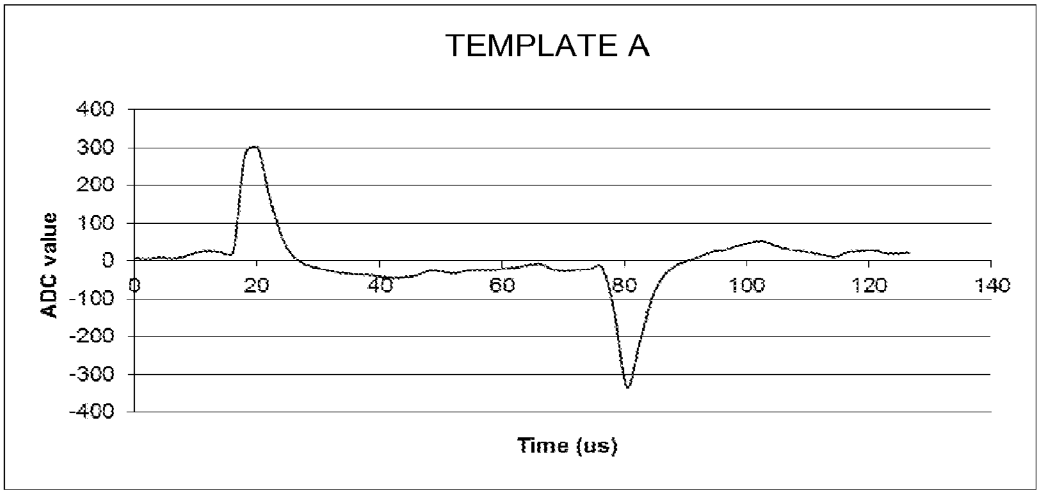
FIG. 6D is a plot of a digital template that may be used to evaluate how closely a signal returned from an implanted device matches the signal of FIG. 6C.

FIG. 6C illustrates a digital recording of an electromagnetic signal returned by a device made by Manufacturer A, when communication is successfully initiated. FIG. 6D is a plot of a digital "template" that may be used to evaluate how closely a signal returned from implanted device 12 matches the signal of FIG. 6C—that is, how well the returned signal matches a signal returned from a device made by Manufacturer A. The template is a sequence of numerical values that when plotted have the same shape as the curve of FIG. 6C. The template of FIG. 6D has 64 values, but other template sizes can be used.

Figure 5:
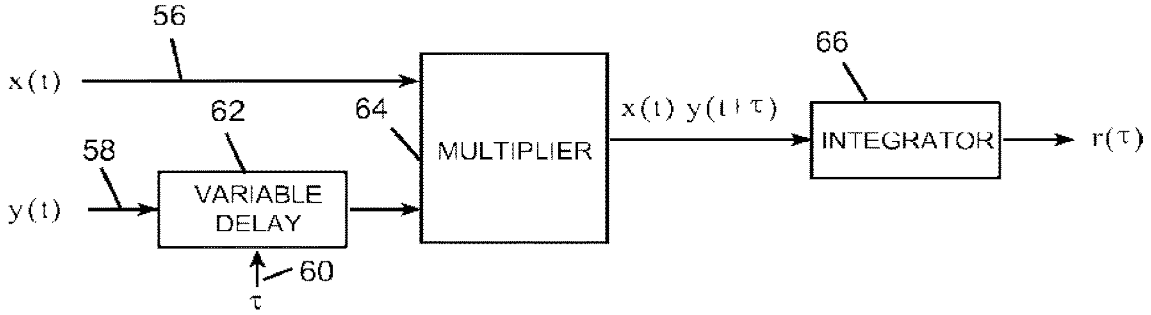
FIG. 5 shows a hardware implementation of cross correlation.

In some embodiments, the comparison of the returned signal to the signal expected from a device from a particular manufacturer is made using cross correlation. The fundamental advantage of cross correlation over other methods like feature extraction is its insensitivity to noise. For continuous real variables, the cross correlation is defined as $$r_{xy}(\tau) = \lim_{T\to\infty} \frac{1}{2T}\int_{-T}^{T} x(t)y(t+\tau)dt$$

where x(t) and y(t) are two infinite-time input waveforms. If the signal x(t) is the same shape as the signal y(t) delayed by τ, the $r_{xy}(\tau)$ will be high. In theory, the calculation is performed over infinite time T, but in practice a finite time is used. FIG. 5 shows a hardware implementation of the cross correlation. The signal x(t) is a known signal, called a template 56. Templates are defined in advance and stored in the machine. The signal y(t) is the observed or measured signal 58. This is the signal measured at the time of the test. The y(t) input is delayed by τ=60 using a time delay function 62. A multiplier 64 creates a product, which is then integrated 66. The r(τ) output 60 will be +1 if the two input signals have the same shape. The τ at which the output is +1 specifies where in the y(t) signal matches the shape of the template x(t). The r(τ) output will be 0 if the two input signals do not have the same shape, and will be −1 if the signals have the same but inverted shapes.

Inherent in the application of cross correlation in computer based systems is the need to operate on finite sequences. Also the continuous signal x(t) is sampled at fixed time intervals x(n). In one embodiment, sampling is performed at 497.777 kHz, but the method works for any suitable sampling rate. FIG. 6D shows an example template x(n) for determining whether or not a particular medical device from Manufacturer A is communicating. The size of the templates can be varied depending on the shape medical device identifier 10 is trying to detect. It is desirable to capture a reasonable window, because the data is actually considered as an infinite periodic signal. In other words, if we process the finite sequence x(0), x(1), x(2), . . . x(N−1)

then the cross correlation will effectively be determined for the infinite sequence, . . . x(0), x(1), x(2), . . . x(N−1), x(0), x(1), x(2), . . . x(N−1), x(0), x(1), x(2), . . . x(N−1), To calculate the cross correlation on digitally-sampled data, average values are first calculated. Assume x(n) and y(n) are the sampled data, and N is the sequence length.

$$\bar{x} = \frac{1}{N}\sum_{n=0}^{n=N-1} x(n)$$

$$\bar{y} = \frac{1}{N}\sum_{n=0}^{n=N-1} y(n)$$

The discrete cross covariance is a rough measure (not scaled to any particular value) of whether or not the signals x(n)

and y(n) have the same shape. The delay parameter, equivalent to the t in the continuous case, is shown as m in the following definition of discrete cross covariance:

$$\gamma_{xy}(m)=\sum_{n=0}^{n=N-1}(x(n)-\overline{x})(y(n+m)-\overline{y})$$

The discrete cross covariance is also a finite-length sequence, but it too can be considered as an infinite periodic sequence. The cross covariance of a signal with itself at delay equal to zero is similar to its variance $$\gamma_{xy}(0)=\sum_{n=0}^{n=N-1}(x(n)-\overline{x})^2\gamma_{xy}(0)=\sum_{n=0}^{n=N-1}(y(n)-\overline{y})^2$$

The discrete cross correlation between two finite sequences x(n) and y(n) is $$r_{xy}(m)=\frac{1000\cdot y_{xy}(m)}{\sqrt{y_{xx}(0)y_{yy}(0)}}-1{,}000\cdot 7,\ (m)$$

Without the 1000 in the above equation, the correlation ranges from −1 to +1. The 1000 is included so that $r_{xy}$ will be the integer part of a fixed point number, ranging from −1000 to +1000. For example, if $r_{xy}$ is 950, it means 0.950. The higher the cross correlation value, the better the match between the template and the signal being evaluated.

The medical devices of one manufacturer communicates differently from the devices of the other manufacturers. However, there are similarities in the protocols that make it possible to create medical device identifier 10. The communication begins by emitting a magnetic field into the device. Some protocols use a DC magnetic field to initiate communication, while others use a time-varying magnetic field. These protocols are very specific. For example, an attempt to communicate via the protocol of one manufacturer will typically not prompt communication from devices that are not manufactured by the same manufacturer. When an appropriate signal is received by the device, it returns another electromagnetic signal.

Figure 7A:
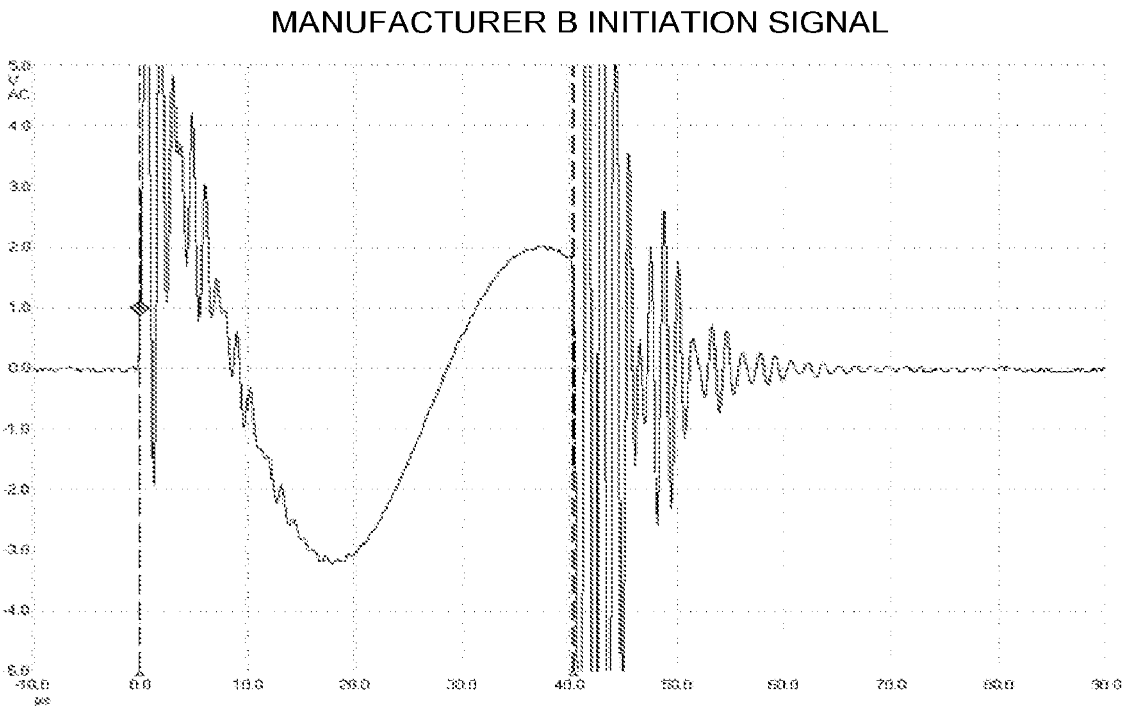
FIG. 7A illustrates a digital recording of an electromagnetic signal generated by a second manufacturer's programming device.
Figure 7B:
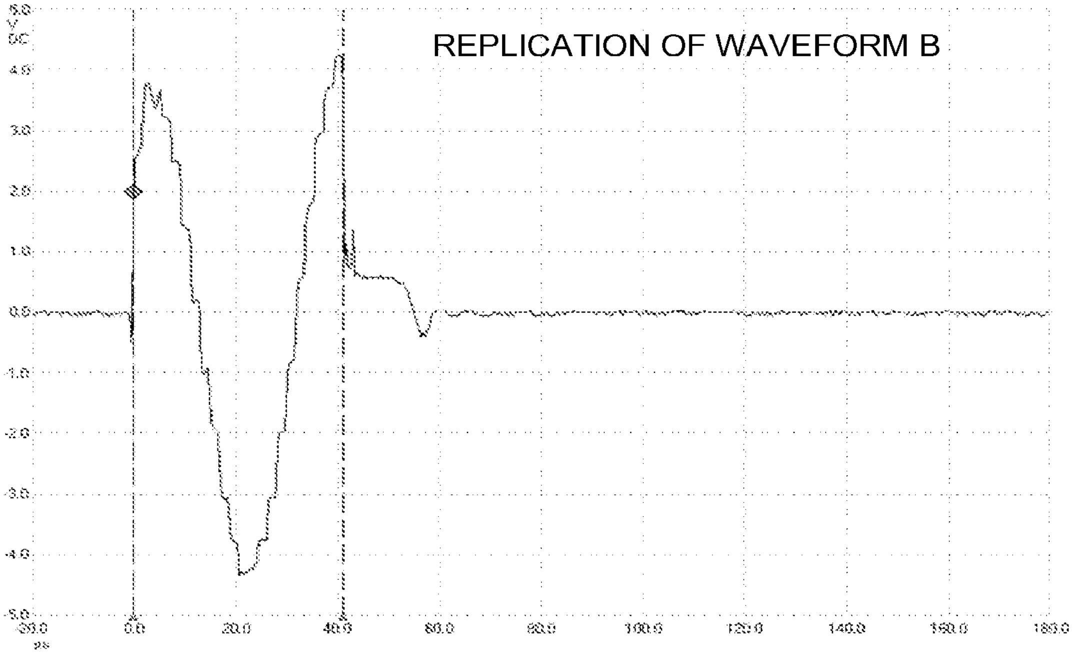
FIG. 7B is a graphical illustration of a replication of the waveform of FIG. 7A, as emitted by an embodiment of the invention.
Figure 7C:
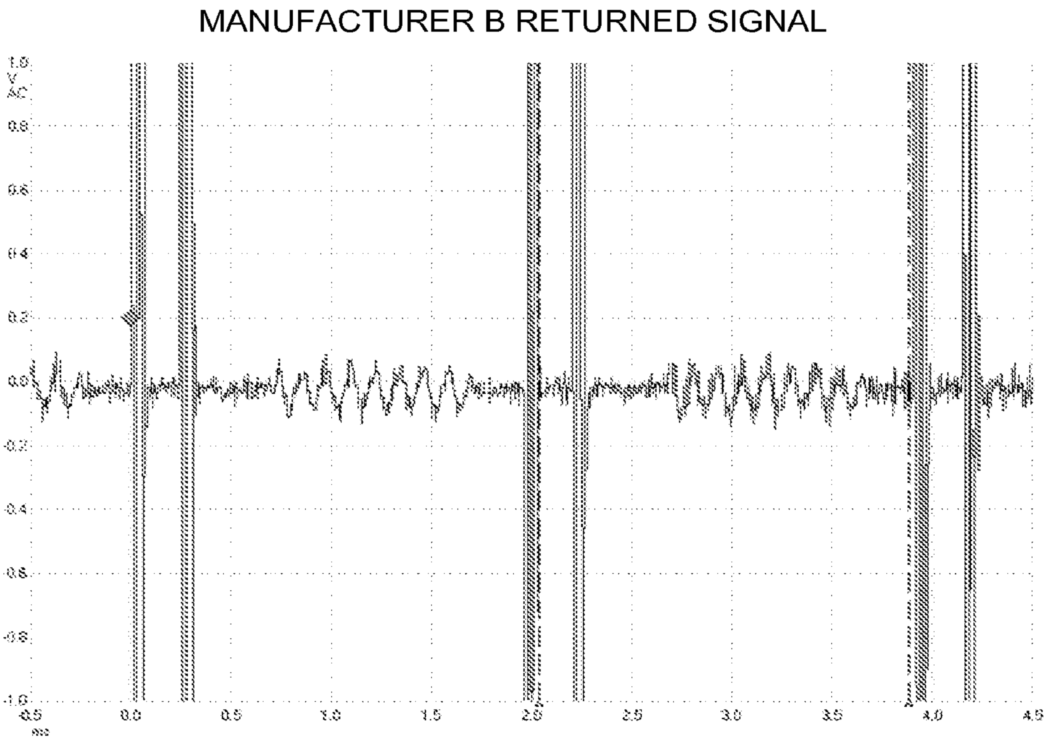
FIG. 7C illustrates a digital recording of an electromagnetic signal returned by a device made by the second manufacturer when communication is successfully initiated.
Figure 7D:
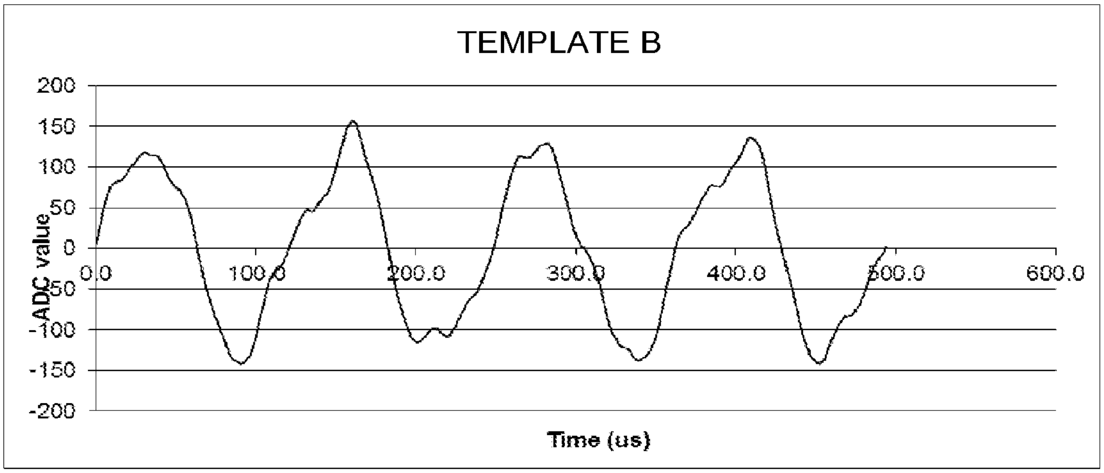
FIG. 7D is a plot of a digital template that may be used to evaluate how closely a signal returned from an implanted device matches the signal of FIG. 7C.

FIG. 7A illustrates a digital recording of an electromagnetic signal generated by a second manufacturer's (Manufacturer B) programming device when it is initiating communication with an implanted medical device from Manufacturer B. FIG. 7B shows a recording of an electromagnetic signal generated by an embodiment of the invention, replicating the signal of FIG. 7A. FIG. 7C illustrates a digital recording of an electromagnetic signal returned by a device made by Manufacturer B, when communication is successfully initiated. FIG. 7D is a plot of a digital template that may be used to evaluate how closely a signal returned from implanted device 12 matches the signal of FIG. 7C—that is, how well the returned signal matches a signal returned from a device made by Manufacturer B. The example template of FIG. 7D has 247 elements.

Figure 8A:
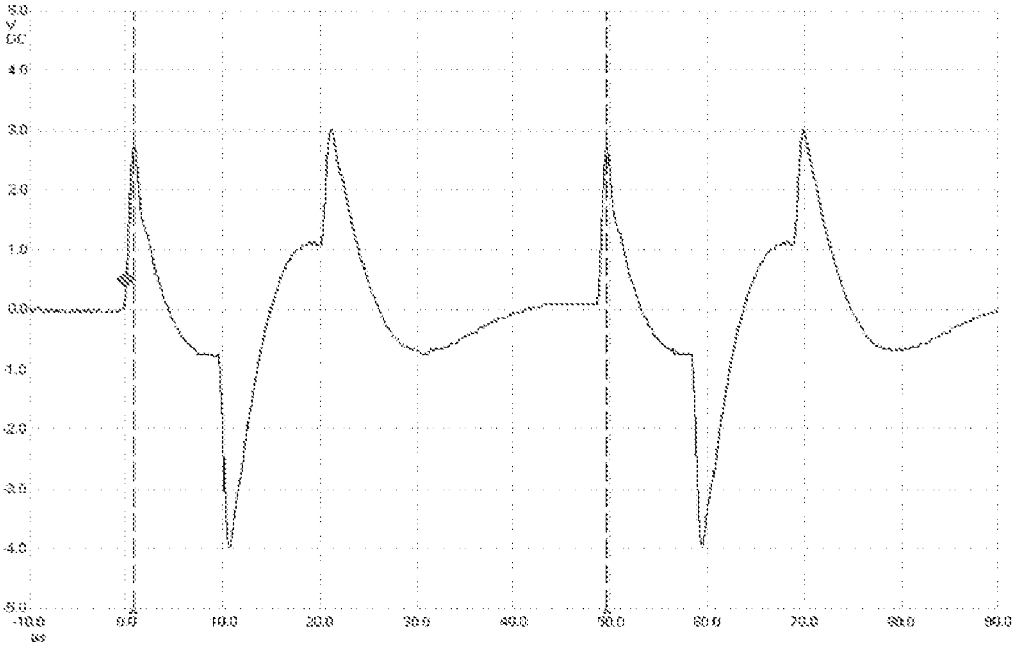
FIG. 8A illustrates a digital recording of an electromagnetic signal generated by a third manufacturer's programming device.
Figure 8B:
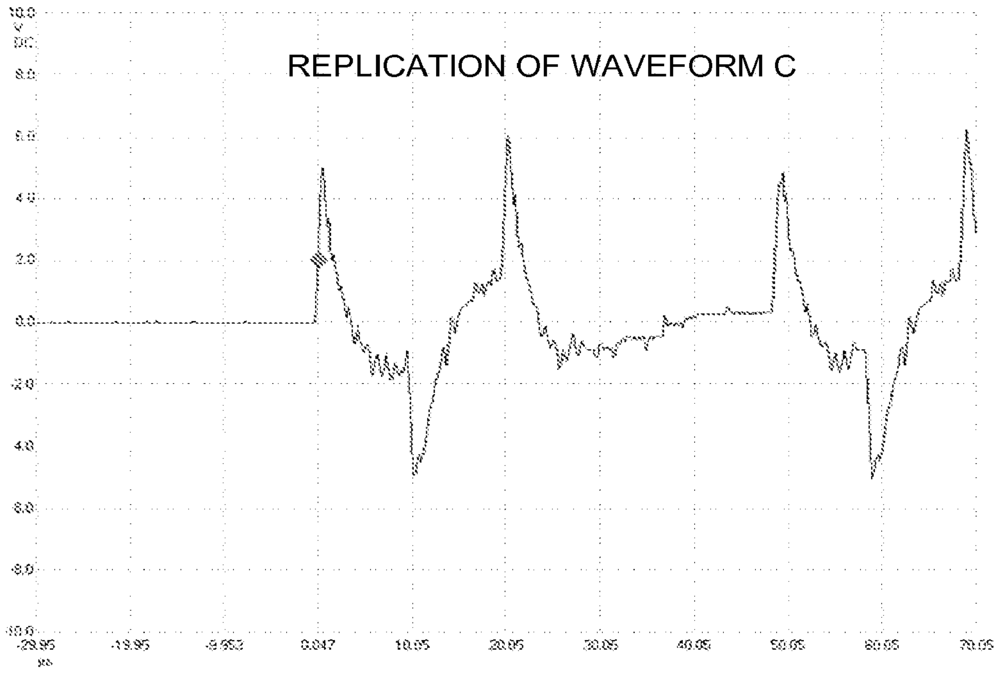
FIG. 8B is a graphical illustration of a digitization of the waveform of FIG. 8A, as emitted by an embodiment of the invention.
Figure 8C:
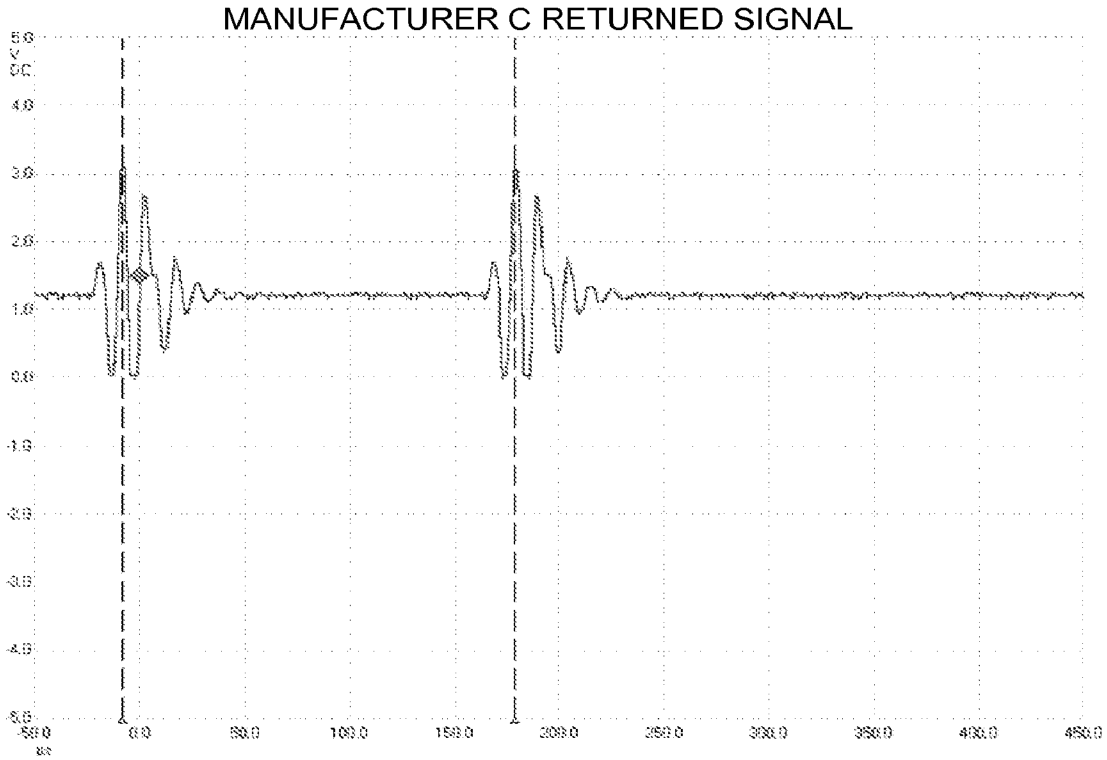
FIG. 8C illustrates a digital recording of an electromagnetic signal returned by a device made by the third manufacturer when communication is successfully initiated.
Figure 8D:
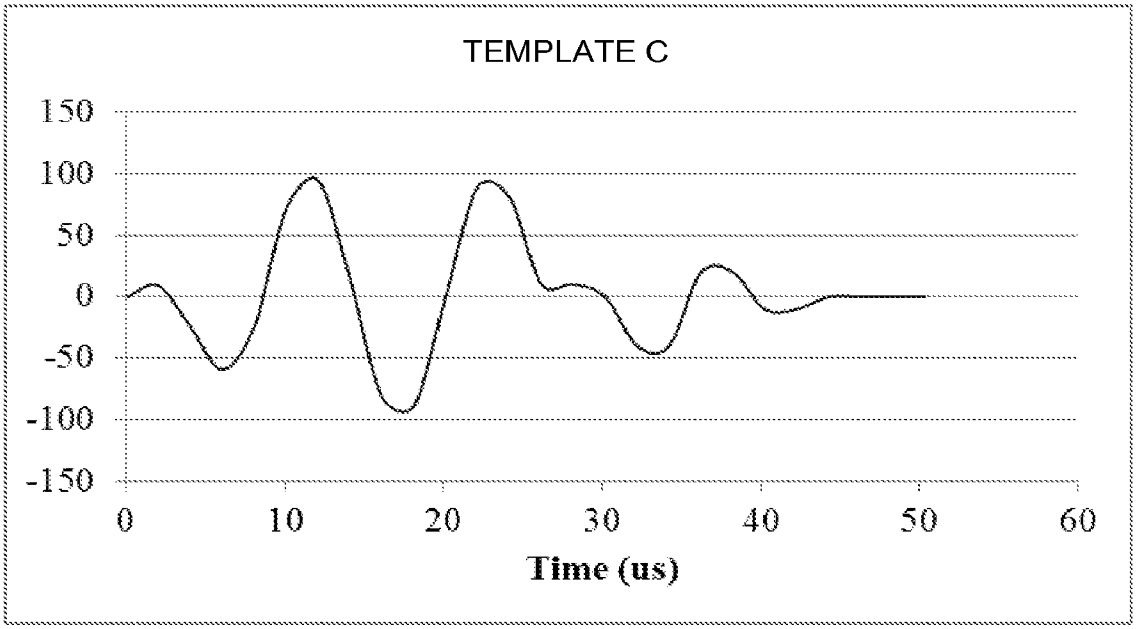
FIG. 8D is a plot of a digital template that may be used to evaluate how closely a signal returned from an implanted device matches the signal of FIG. 8C.

FIG. 8A illustrates a digital recording of an electromagnetic signal generated by a third manufacturer's (Manufacturer C) programming device when it is initiating communication with an implanted medical device from Manufacturer C. FIG. 8B shows a recording of an electromagnetic signal generated by an embodiment of the invention, replicating the signal of FIG. 8A. FIG. 8C illustrates a digital recording of an electromagnetic signal returned by a device made by Manufacturer C, when communication is successfully established. FIG. 8D is a plot of a digital template that may be used to evaluate how closely a signal returned from implanted device 12 matches the signal of FIG. 8C—that is, how well the returned signal matches a signal returned from a device made by Manufacturer C. The example template of FIG. 8D has 26 elements.

Figure 9A:
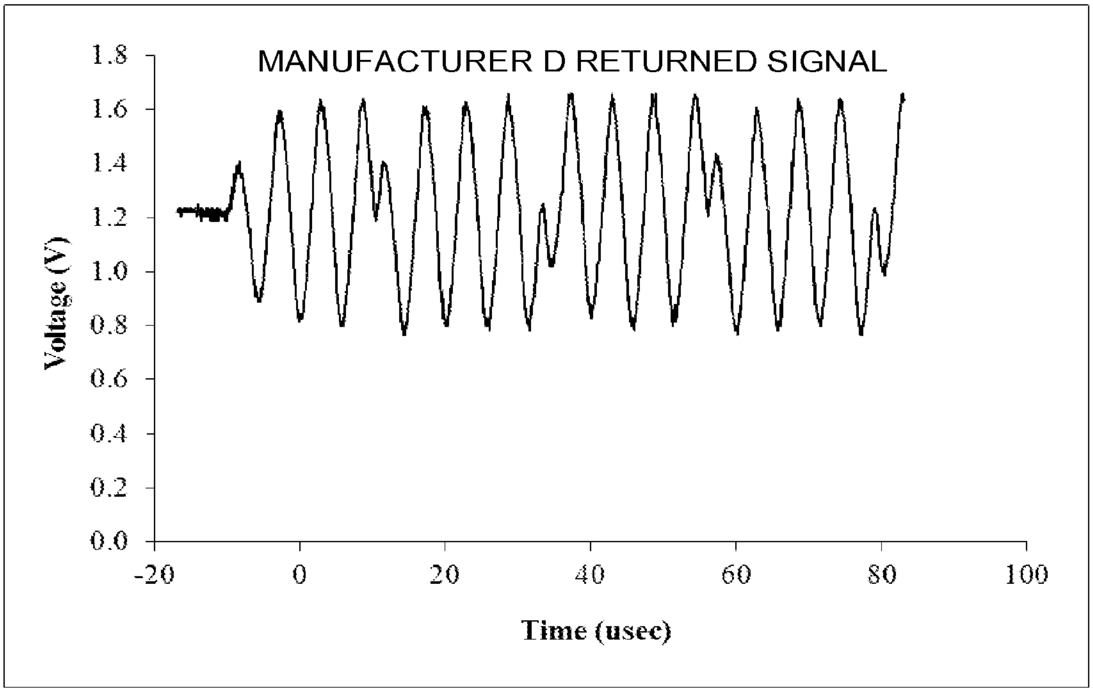
FIG. 9A shows a typical signal emitted by a pacemaker from a fourth manufacturer after communication is initiated by application of a DC magnetic field.
Figure 9B:
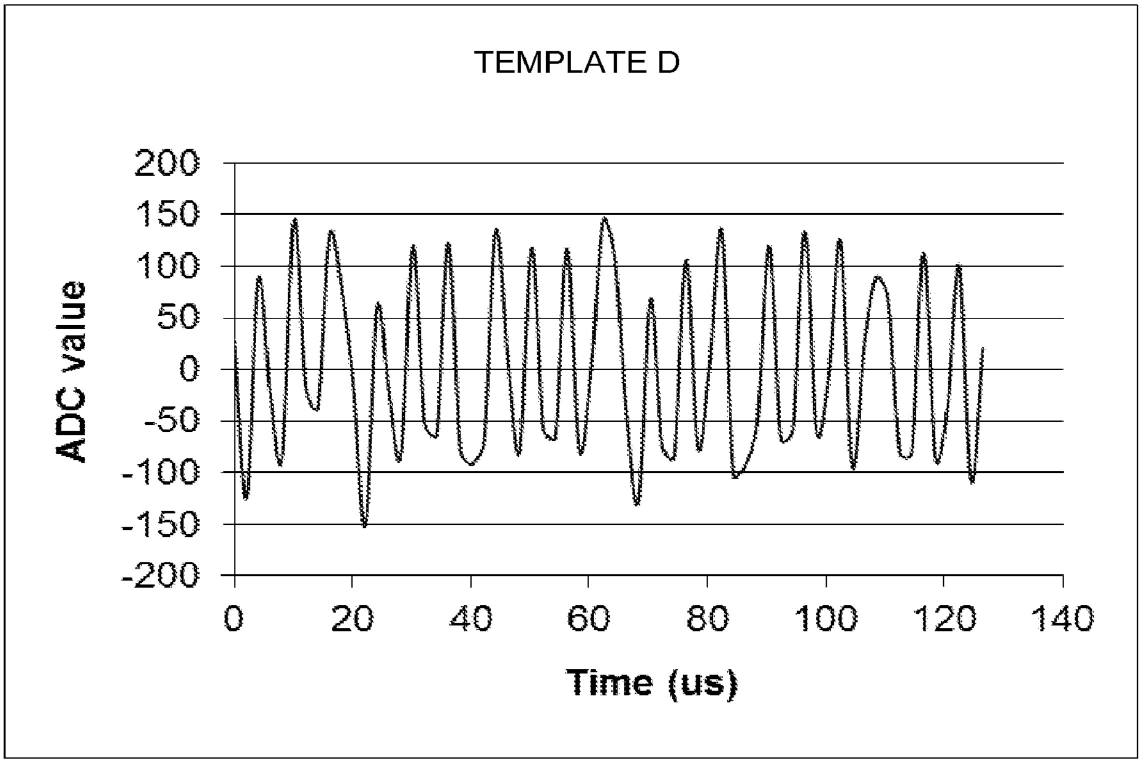
FIG. 9B is a plot of a digital template that may be used to evaluate how closely a signal returned from an implanted device matches the signal of FIG. 9A.

Devices from some manufacturers respond to simple DC magnetic fields to initiate communication. FIG. 9A shows a typical signal emitted by a pacemaker from a fourth manufacturer (Manufacturer D) after communication is initiated by application of a DC magnetic field. FIG. 9B is a plot of a digital template that may be used to evaluate how closely a signal returned from implanted device 12 matches the signal of FIG. 9A—that is, how well the returned signal matches a signal returned from a device made by Manufacturer D. The example template of FIG. 9B has 64 elements.

Figure 10A:
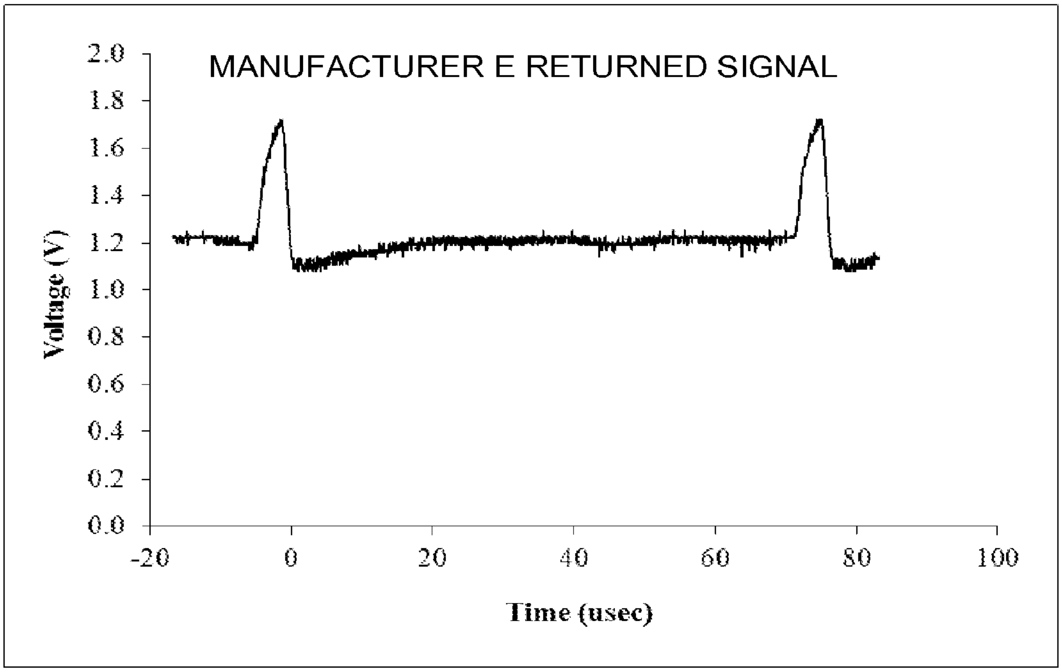
FIG. 10A shows a typical signal emitted by a pacemaker from a fifth manufacturer after communication is initiated by application of a DC magnetic field.
Figure 10B:
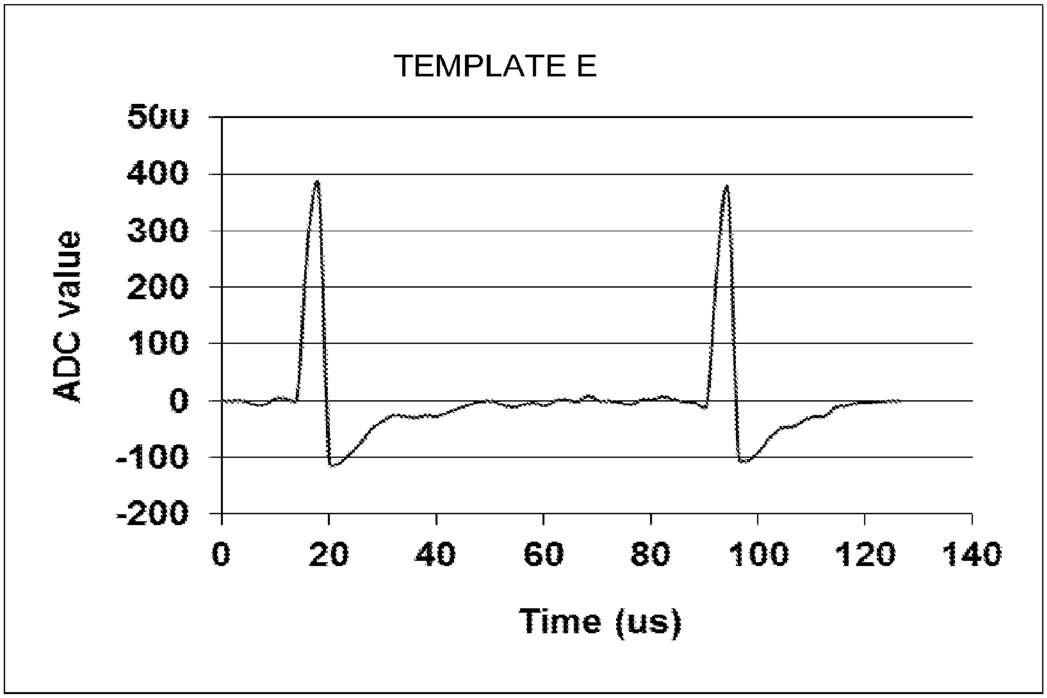
FIG. 10B is a plot of a digital template that may be used to evaluate how closely a signal returned from implanted device matches the signal of FIG. 10A.

FIG. 10A shows a typical signal emitted by a pacemaker from a fifth manufacturer (Manufacturer E) after communication is initiated by application of a DC magnetic field. FIG. 10B is a plot of a digital template that may be used to evaluate how closely a signal returned from implanted device 12 matches the signal of FIG. 10A—that is, how well the returned signal matches a signal returned from a device made by Manufacturer E. The example template of FIG. 10B has 64 elements.

While relatively short waveforms are shown in FIGS. 6A-10B, communication with various implanted devices may involve sending the appropriate signal repeatedly, with time delays between repetitions of the signal or groups of repetitions. Similarly, the device may respond with repeated transmissions of its returned waveform. These patterns can be readily determined for any particular device and manufacturer by recording the signals exchanged by the manufacturer's equipment.

Figure 11:
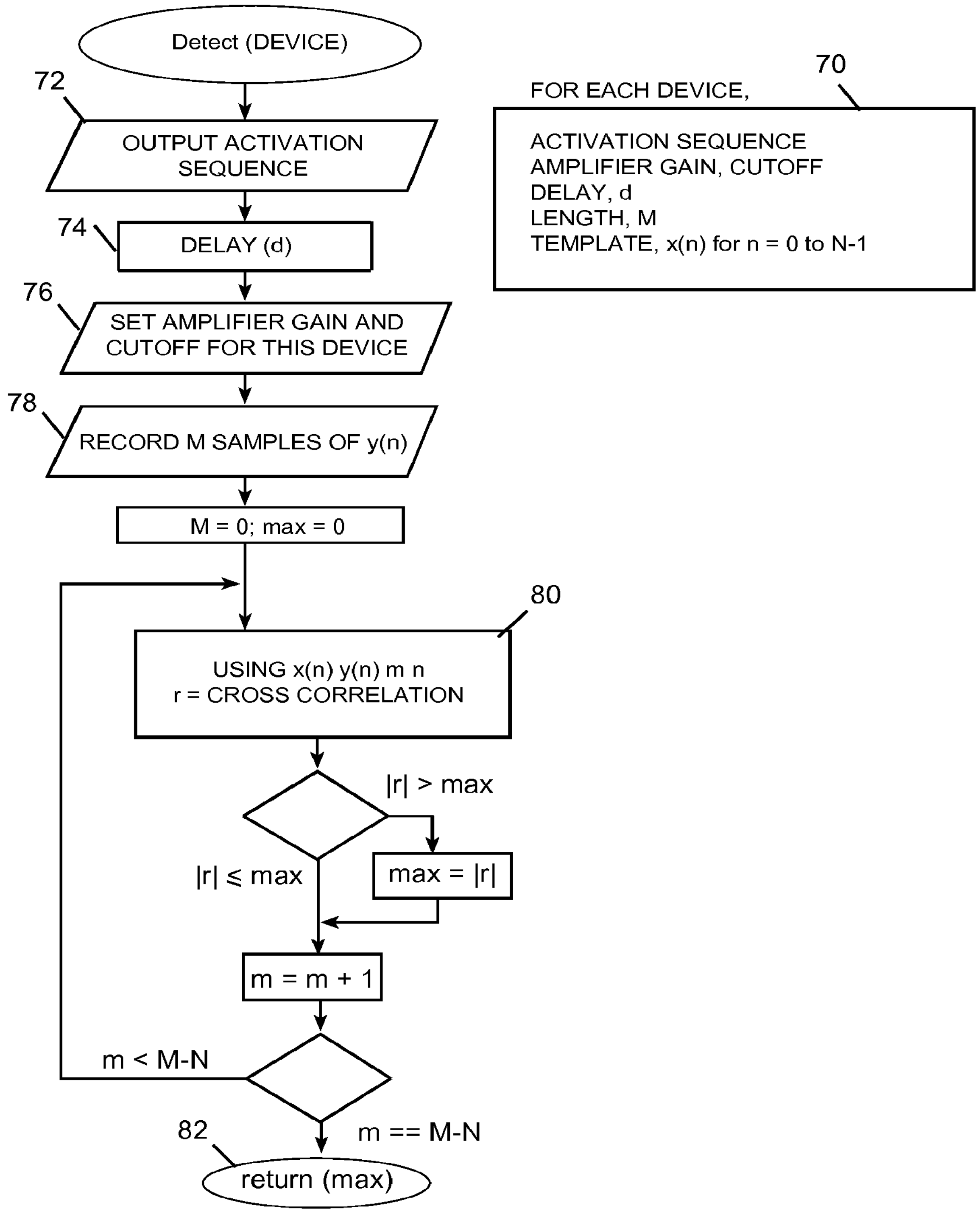
FIG. 11 is a flowchart of a method that may be used by medical device identifier to detect a medical device, in accordance with embodiments of the invention.

FIG. 11 is a flowchart of a method that may be used by medical device identifier 10 to detect a medical device, in accordance with embodiments of the invention. In this example, each device has five characteristics used for detection 70. For some devices, an activation sequence is used, in which one of the stored digitized waveforms is output to DAC 32 to initiate communication 72. FIGS. 6B, 7B, and 8B illustrate example waveforms generated by an embodiment of the invention. The activation sequence also includes the time period between DAC outputs. The sequence, the length of the sequence, and the time between outputs are unique to each manufacturer type. After sending an activation sequence, the software delays for a certain amount of time 74. This delay depends on which manufacturer type it is trying to detect. Next, the software sets the amplifier gain, cutoff, sampling rate and sample length 76. Again these sampling parameters depend on the device. The primary coil is set to passive mode and M samples are collected 78. N is the size of the template, and M will be much larger than N. For each time shift m, a cross correlation is calculated 80 as described above. Cross correlation is very robust such that broad band noise will not trigger a false detection. Cross correlation is calculated M-N times, and the largest result 82 is returned.

Figure 12:
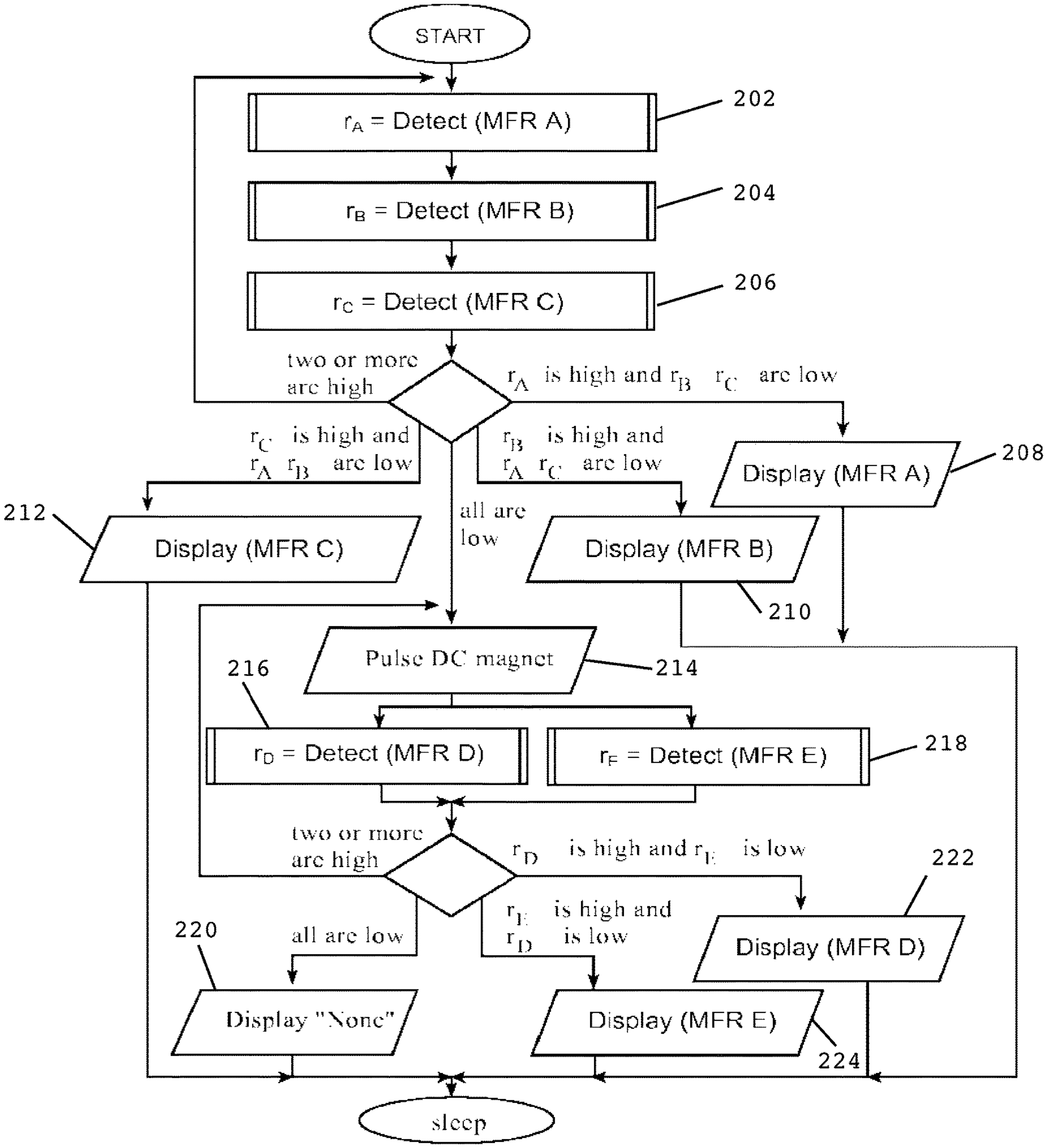
FIG. 12 is a flowchart of a method that may be used by medical device identifier to identify a medical device, in accordance with embodiments of the invention.

One by one the medical device identifier attempts to communicate with the list of potential devices as described in FIG. 12. A device is found if the detection algorithm in FIG. 11 returns a high correlation in one, and low correlations in the others. The pacemaker manufacturer may then be displayed on user interface 44 as shown in FIG. 3. Depending on the number of potential devices searched, the entire process may take only a few seconds. The devices that initiate communication upon receipt of a time-varying activation sequence are interrogated first, because the initiation process and the response are both specific to the manufacturer. Second, the DC magnetic field is applied, and all the devices that initiate communication with a DC magnetic field are searched using the same recorded ADC samples y(n).

As described in FIG. 12, a determination is made, using cross-correlation, whether returned signals from the medical device match signals known to be transmitted by a different manufacturers. At 202, a determination is made whether the device is manufactured by manufacturer A. At 204, a determination is made whether the device is manufactured by manufacturer B. At 206, a determination is made whether the device is manufactured by manufacturer C. If the determination results in the identity of two or more devices being returned, the determination can be repeated.

At 208, manufacturer A will be displayed on a display device in response to determining that the cross-correlation revealed the medical device to be manufactured by manufacturer A. At 210, manufacturer B will be displayed on a display device in response to determining that the cross-correlation revealed the medical device to be manufactured by manufacturer B. At 212, manufacturer C will be displayed on a display device in response to determining that the cross-correlation revealed the medical device to be manufactured by manufacturer C.

At 214, in response to the cross-correlation indicating that no manufacturer of the medical device has been identified, a DC magnet can be pulsed. All the devices that initiate communication with a DC magnetic field are searched using the same recorded ADC samples y(n). At 216, a determination can be made as to whether manufacture D manufactured the medical device. At 218, a determination can be made as to whether manufacture E manufactured the medical device. If the determination indicates more than one manufacture, the DC magnet can be pulsed again and the determination can be redone.

At 220, if no determination can be made as to the manufacturer of the medical device, "None" can be displayed. At 222, in response to determining that manufacture D manufactured the medical device, manufacture D can be displayed. At 224, in response to determining that manufacture E manufactured the medical device, manufacture E can be displayed.

It will be recognized that medical device identifier 10 need not interpret or recognize any content in the signal being received from a medical device in order to identify the device. Medical device identifier need only associate some unique feature of the returned signal with a particular device manufacturer.

Many variations and optional features are possible. For example, measured responses and calculated correlation coefficients can be recorded in storage 46, as shown in FIG. 3. Possibilities for this storage include but are not limited to internal flash EEPROM of the microcontroller or an external secure digital card (SDC). The time and date can be entered when the batteries are installed into medical device identifier 10. In sleep mode, the medical device identifier 10 may maintain the time and date. Medical personnel can retrieve this data along with time and date, and this data can be used to improve the accuracy of the device.

In some embodiments, rather than requiring one correlation to be high and the remaining correlations low, the medical device identifier could simply report the device with the highest correlation.

For each particular region of the world, probabilities may be known a priori of finding the devices of each manufacturer. These priori expectations could be used as weighting factors when the medical device identifier is choosing between two or more potential matches.

A medical device identifier according to embodiments may be easily adaptable to future medical devices that use magnetic fields to communicate. To identify a new device, the medical device identifier (or a computing device in communication with the medical device identifier) would be supplied with a digitized waveform of the magnetic field needed to initiate communication, and with programming to detect aspects of any returned signal, for example the signal shape, amplitude, or frequency components. Other than a simple software upgrade, additional devices can be added without major design changes.

In other embodiments, a medical device identifier may identify medical devices that use means other than magnetic fields to communicate. For example, medical devices may communicate using channels such as RF radio, ZigBee®, Texas Instruments SimpliciTI®, Bluetooth®, Bluetooth® Low Energy (BLE), Bluetooth® 4.0, Z-Wave, 6LoWPAN, near field communication (NFC), and IEEE 802.11®. A medical device identifier would include circuitry for communicating on the channel used by the medical devices to be identified, and would be provided with any field generation information needed to initiate communication. The responses (identifying information) from the device to be identified would be analyzed, and an identification made based on the results.

While cross correlation has certain advantages as a method of recognizing a returned waveform, a number of methods are possible for determining whether or not a certain event has occurred. The medical device identifier could perform a Discrete Fourier Transform (DFT) and look for specific frequencies emitted by the device. For example, the fundamental frequency emitted by Manufacturer D pacemakers is 175 kHz. Frequencies used by other devices are listed in Table 1.

TABLE 1

Carrier frequencies used by the major pacemaker companies

| Pacemaker | Frequency |
|---|---|
| Manufacturer D | 175 kHz |
| Manufacturer C | 82 kHz |
| Manufacturer A | 64 kHz |
| Manufacturer B | 58 kHz |

Another method to determine whether or not an event has occurred is feature extraction. Features include but are not limited to time between pulses, the width of a pulse, the area of a pulse, the energy of a pulse, and the direction of a pulse. Another feature existing in these waves is phase shifts and the time between phase shifts.

In some embodiments, a medical device identifier may be attached to or built into an existing pacemaker programmer to determine if the programmer is being used on the correct pacemaker. If not correct, the disclosed device could alert the operator which programmer should be used.

Figure 13:
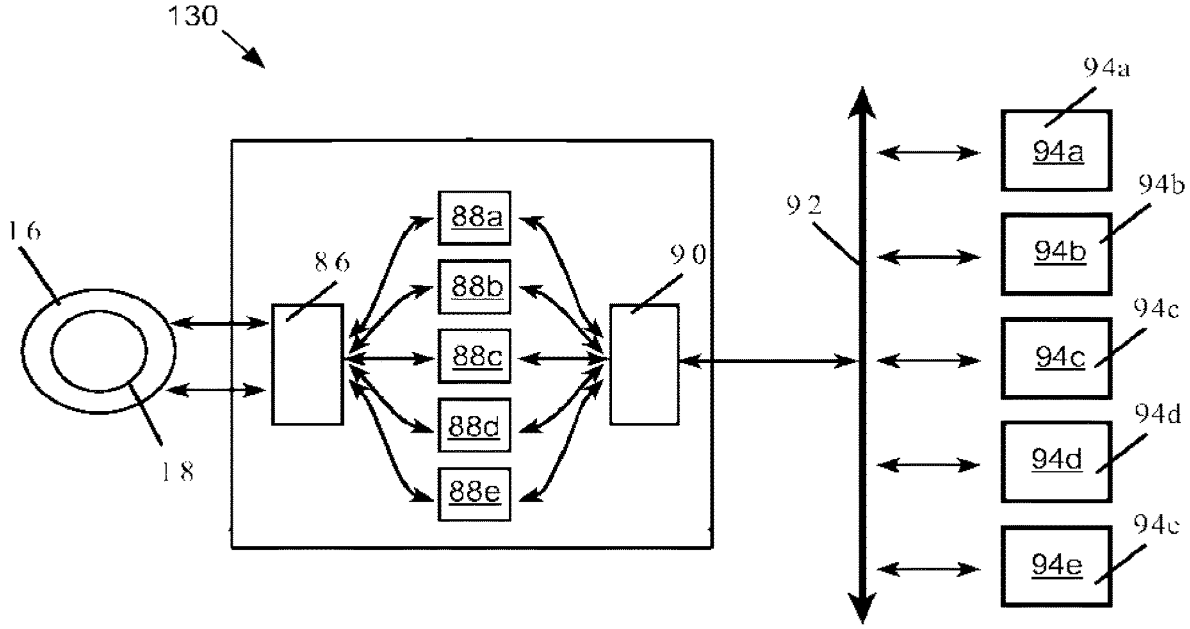
FIG. 13 shows a simplified block diagram of a portal device in accordance with embodiments of the invention.

In another aspect, a medical device identifier such as medical device identifier 10 may be a component of a universal programmer or portal device. FIG. 13 shows a simplified block diagram of a portal device 130 in accordance with embodiments of the invention.

In the system of FIG. 13, the block 86 is part of an identification subsystem that is configured to identify, from a plurality of possible providers, the provider of a medical device that is in proximity to portal device 130. For the purposes of this disclosure, for a device to be "configured" to accomplish a result or perform a step or function means that the device includes an arrangement of hardware, programming, or both, that causes the result to occur or the step or function to be performed. The identification subsystem may operate in any workable manner, for example as described above with respect to the system of FIG. 3. In such an embodiment, portal device 130 may emit an electromagnetic signal using coil 16, and receive a returned electromagnetic signal (a form of identifying information as disclosed herein) from the medical device to be identified via coil 18. The returned electromagnetic signal may be digitized, and the portal device may then identify the medical device manufacturer or other provider based on the digitized returned waveform.

Portal device 130 also includes a communications subsystem 90, through which portal device 130 can establish two-way communication over an electronic link 92 with any of a plurality of call centers 94 *a*-94 *e*. Call centers 94 *a*-94 *e* are operated by respective medical device providers, for example Manufacturers A-E as discussed above. Electronic link 92 may be any suitable communication channel, for example a telephone or Internet channel, and may utilize any workable protocol, such as but not limited to TCP/IP.

Once the identification subsystem has identified the provider of the medical device, it establishes communication over link 92 with the corresponding provider's call center. Portal device 130 can then act as a relay device, relaying information received from the medical device to the appropriate call center, and relaying information from the call center to the medical device. For example, portal device 130 may include a number of translation modules 88 *a*-88 *e*, for interpreting electromagnetic signals received from the medical device and converting them to information to be transmitted to the appropriate call center, and for converting information received from the call center to an appropriate digital waveform to be transmitted to the medical device. Translation modules 88 *a*-88 *e* may be, for example, software or firmware libraries provided by the medical device manufacturers, to be executed by a processor within portal device 130. In this way, the maker of portal device 130 does not need to know the meanings of waveforms exchanged with the medical device. Rather, portal device 130 may merely blindly convert and forward information from the appropriate call center to the medical device and waveforms received from the medical device to the appropriate call center, without knowledge of the communication protocols used by the various medical device providers. Personnel at the appropriate call center can then interact directly with the implanted device, reading information from it. This arrangement may eliminate the need for a medical device manufacturer to provide a network of service personnel, and may enable manufacturers to enter markets that have been previously uneconomical.

Figure 14A:
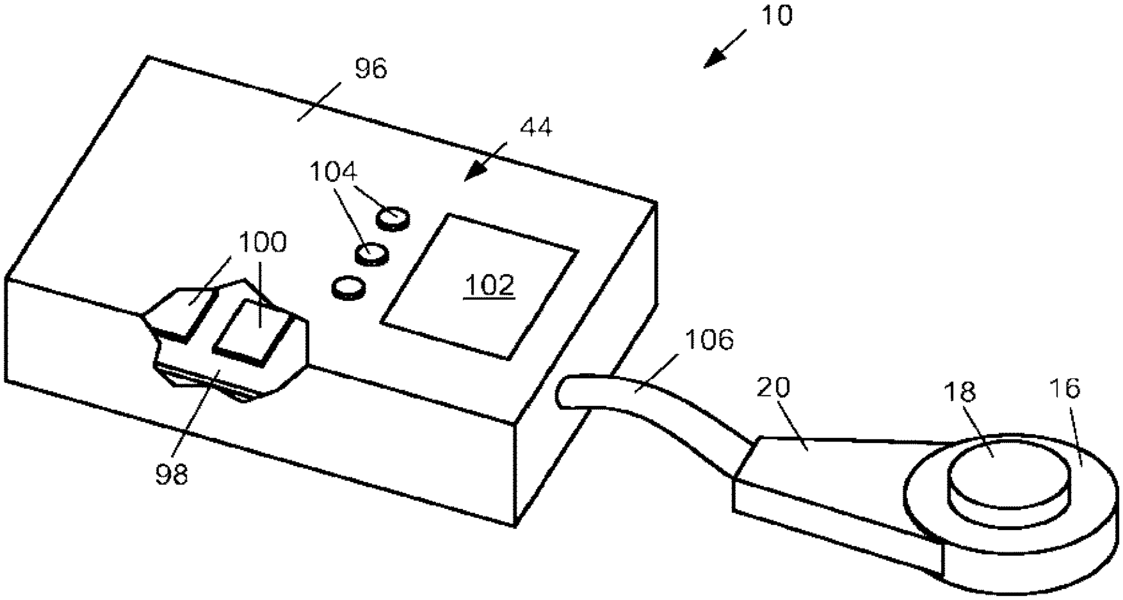
FIGS. 14A and 14B illustrate example mechanical architectures for a medical device identifier.
Figure 14B:
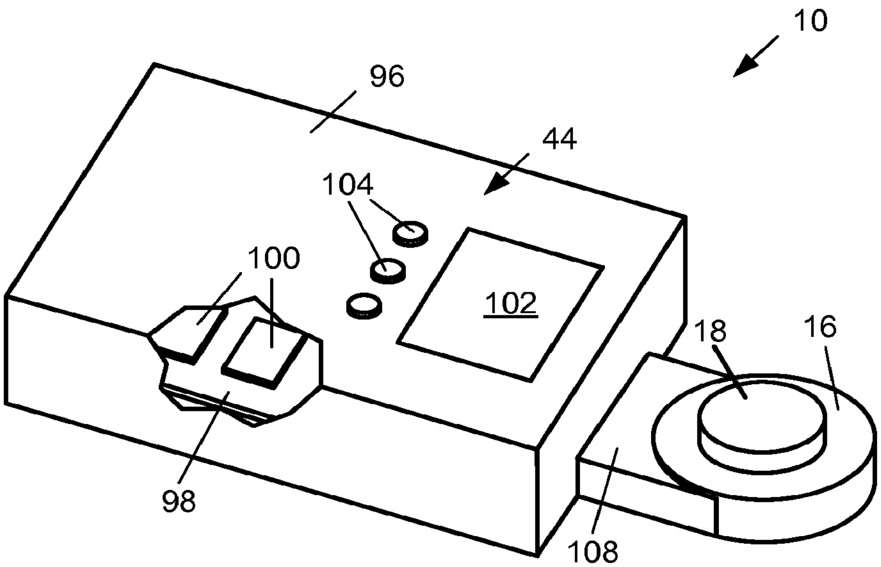

FIGS. 14A and 14B illustrates example mechanical architectures for a medical device identifier 10. In the embodiment of FIG. 14A, example medical device identifier 10 includes a housing 96 and a printed circuit board 98 within housing 96 carrying control electronics 100. Control electronics 100 may implement a circuit like that shown schematically in FIG. 3. User interface 44 includes a display 102 and various buttons or other input devices 104. Coils 16 and 18 are positioned away from printed circuit board 98, so as to avoid interference with the operation of coils 16 and 18. Coils 16 and 18 may be conveniently mounted to a handle 20, and coupled to printed circuit board 98 via a cable 106. In the embodiment of FIG. 14B, coils 16 and 18 are mounted in portion 108 that extends from housing 96.

Figure 15:
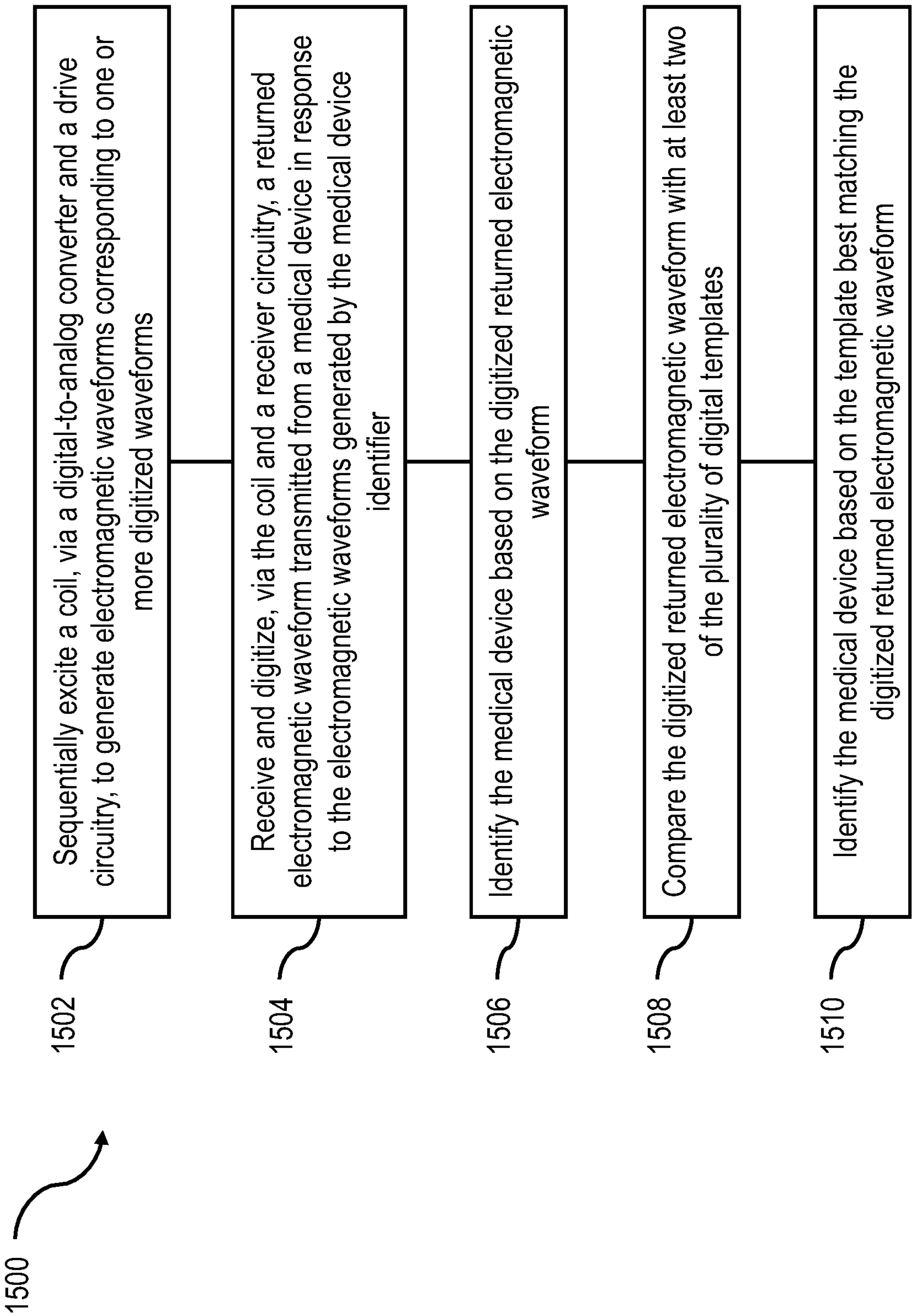
FIG. 15 illustrates a process flow diagram having one or more features consistent with the present description.

FIG. 15 is a process flow diagram 1500 having one or more features consistent with the present description. The operations described in process flow diagram 1500 can be performed by one or more devices. In some variations, individual operations may be split into two or more operations. Similarly, multiple operations may be combined into a single operation.

At 1502, a coil can be sequentially excited. Sequential excitement can occur via a digital-to-analog converter and a drive circuitry, to generate electromagnetic waveforms corresponding to one or more digitized waveforms.

At 1504, a returned electromagnetic waveform transmitted from a medical device can be received and digitized via the coil and a receiver circuitry. The electromagnetic waveform (or other identifying information) can be transmitted from the medical device in response to the electromagnetic waveforms generated by the medical device identifier.

At 1506, the medical device can be identified based on the digitized returned electromagnetic waveform (or other identifying information).

At 1508, the digitized returned electromagnetic waveform (or other identifying information) can be compared with at least two of the plurality of digital templates.

At 1510, the medical device can be identified based on the template best matching the digitized returned electromagnetic waveform.

Figure 16:
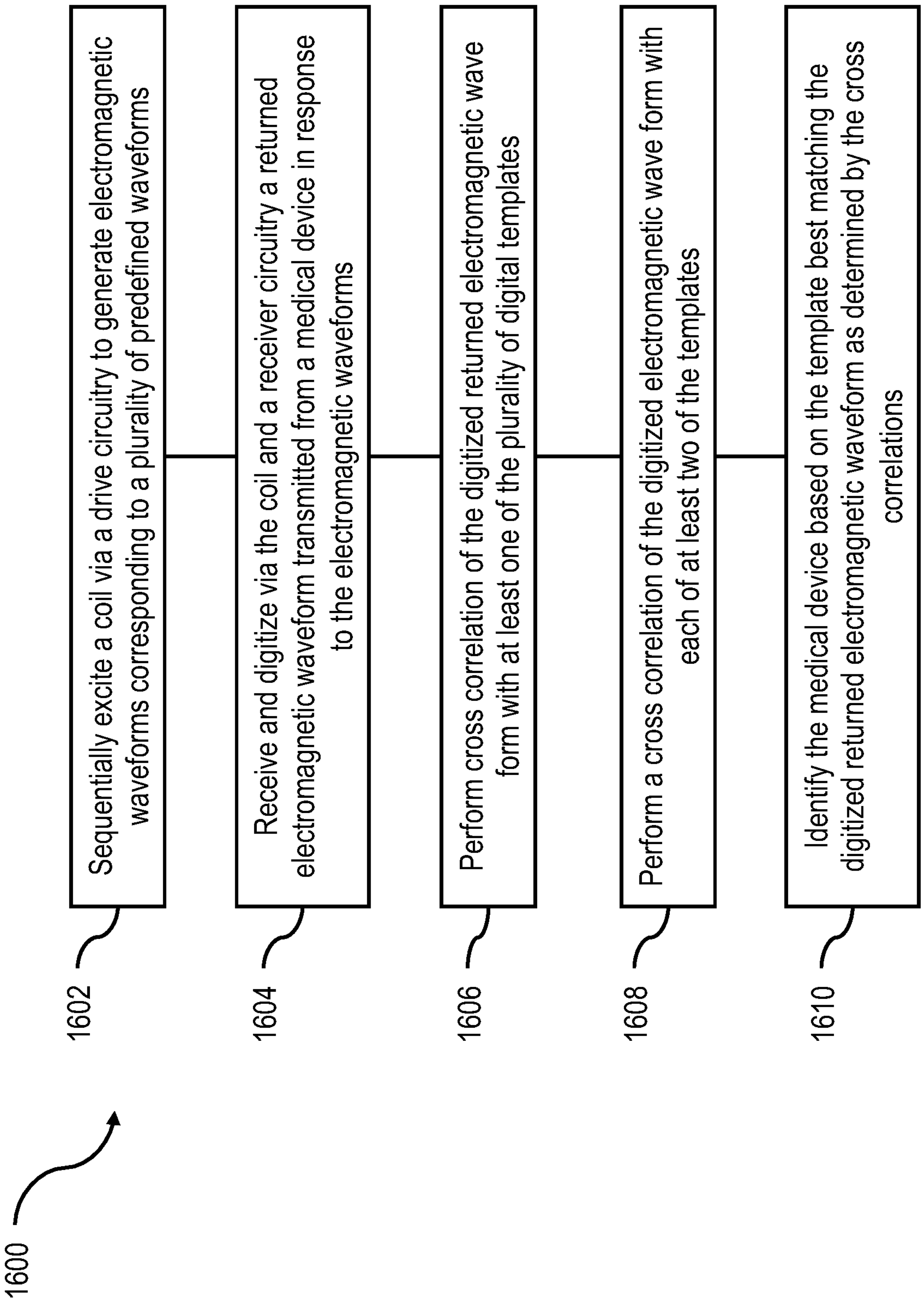
FIG. 16 illustrates a process flow diagram having one or more features consistent with the present description.

FIG. 16 is a process flow diagram 1600 having one or more features consistent with the present description. The operations described in process flow diagram 1600 can be performed by one or more devices. In some variations, individual operations may be split into two or more operations. Similarly, multiple operations may be combined into a single operation.

At 1602, a coil can be sequentially excited via a drive circuitry to generate electromagnetic waveforms corresponding to a plurality of predefined waveforms.

At 1604, a returned electromagnetic waveform (or other identifying information) transmitted from a medical device can be received and digitized via the coil and a receiver circuitry in response to the electromagnetic waveforms.

At 1606, cross correlation of the digitized returned electromagnetic wave form (or other identifying information) can be cross correlated with at least one of the plurality of digital templates.

At 1608, a cross correlation can be performed of the digitized electromagnetic wave form (or other identifying information) with each of at least two of the templates.

At 1610, the medical device can be identified based on the template best matching the digitized returned electromagnetic waveform (or other identifying information) as determined by the cross correlations.

Security Screening Systems Including Medical Device Identifiers

Figure 17:
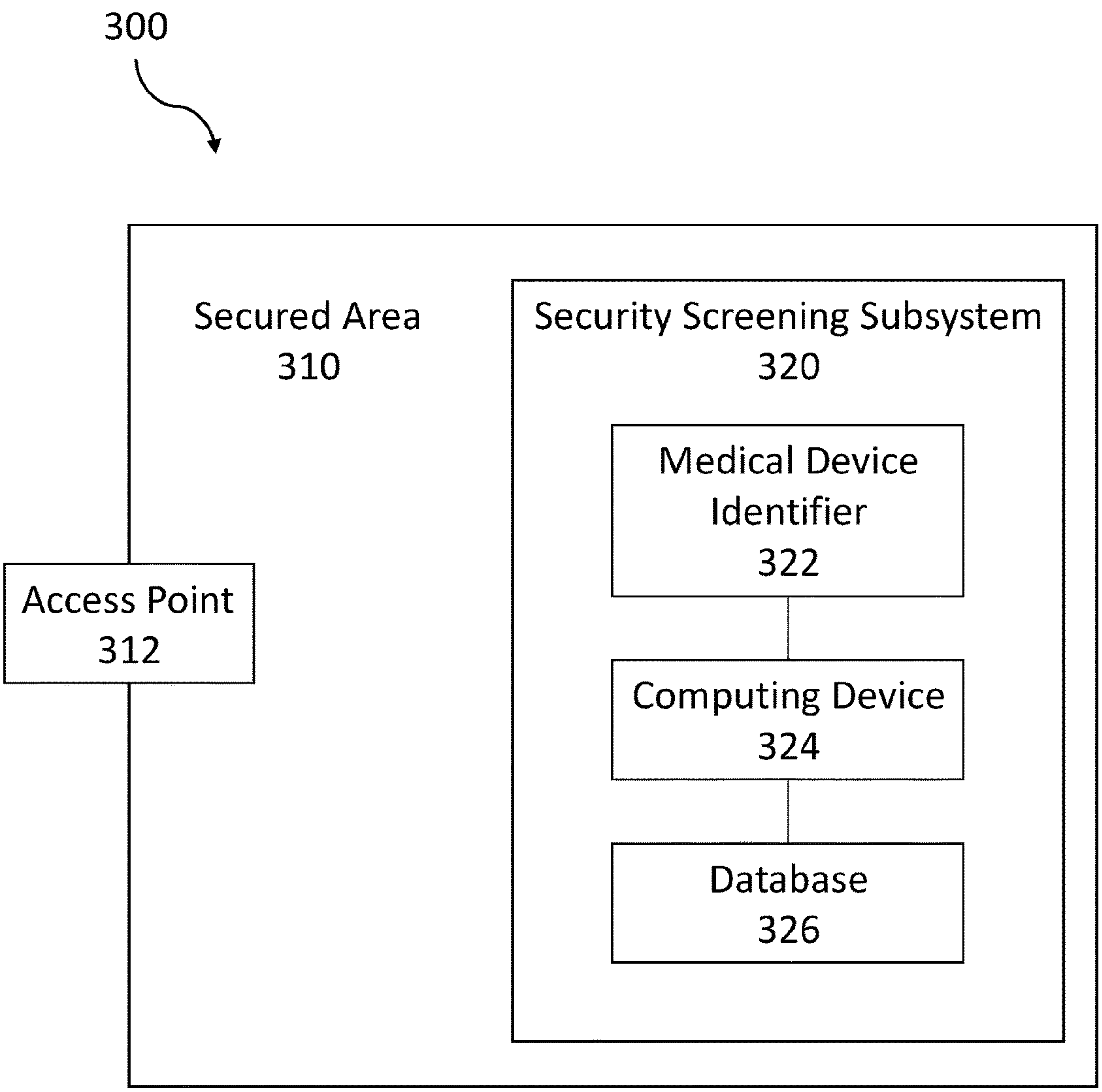
FIG. 17 shows a block diagram of an exemplary security screening system.

Disclosed herein with reference to FIG. 17 is a security screening system 300. The security screening system 300 may be used to screen individuals requesting entrance into a secured arca 310. Individuals with internal implants or medical devices, such as artificial knees, hips, pacemakers, defibrillators, etc. should not be screened through walk-through metal detectors as these implants may comprise metal. Instead, conventional methods of screening these individuals may include advanced imaging technology screening, which typically includes X-ray imaging, or pat-down screening. These forms of screenings may be expensive, time consuming and/or intrusive. The security screening system 300 disclosed herein may be faster, easier, less expensive, and less intrusive than existing security screening systems used to identify implanted medical devices. In one aspect, the implanted medical device may be a cardiac implant, for example a pacemaker. The security screening system 300 may be used to identify implanted medical devices in less than 1 minute, less than 30 seconds, or less than 10 seconds. In one aspect, the security screening system 300 may be used to identify implanted medical devices in less than 20 seconds. The security screening system 300 may reduce lines and wait times at security checkpoints. The security screening system 300 may be used to identify implanted medical devices without using imaging technology. Optionally, the security screening system 300 may be used to identify or confirm a registered status of implanted medical devices without X-ray imaging.

The security screening system 300 may comprise a secured area 310 and a security screening subsystem 320. The secured area 310 may be located within any public space requiring security screening. Optionally, the secured area 310 may be located within an airport, a stadium, an arena, a theatre, an amusement park, a secured facility (e.g., a bank, jail, prison, courthouse, government building, a museum, and the like), an entertainment venue, a cruise ship, or a public event space. The secured area 310 may have an access point 312. Individuals requesting access into the secured area 310 may enter through the access point 312. Optionally, the secured arca 310 can comprise a plurality of access points 312 through which individuals can enter.

The security screening subsystem 320 may have a medical device identifier 322, which can include or be in communication with a computing device 324 and a database 326. The medical device identifier 322 may include any and all combinations of the details, embodiments and/or aspects of the medical device identifier 10 described herein. Although described and labeled as separate components, it is contemplated that two or more of the medical device identifier 322, computing device 324, and database 326 can be provided as a single component and/or can be integrated into a single housing or other structure. For example, in some optional aspects, the medical device identifier 322 can comprise the computing device 324, which can comprise hardware that is configured to perform the functions of the medical device identifier as further disclosed herein. Alternatively, in other aspects, it is contemplated that the computing device 324 and/or database 326 can be positioned at a different location than the medical device identifier 322. For example, it is contemplated that the medical device identifier 322 can be positioned near an individual secking entry into a secured area, while the computing device 324 can be located in a security office (or other area where information is analyzed to determine whether the individual should be granted entry).

The medical device identifier 322 may be positioned at, near, or within the secured arca 310. The medical device identifier 322 may be positioned at the access point 312. The medical device identifier 322 may be configured to provide an output indicative of identifying information (e.g., an identity) associated with an implanted medical device of an individual seeking entry into the secured area 310. The identifying information associated with the implanted medical device may include the return electromagnetic waveform/signature associated with the device. In exemplary aspects, either the medical device identifier 322 or the computing device 324 can be configured to compare the identifying information (e.g., electromagnetic waveform/signature) with a plurality of templates (for example, in database 326) to determine a manufacturer of the implanted medical device, a model of the implanted medical device, and/or a registration status of the implanted medical device (whether the device is on a list of registered medical devices).

Figure 18:
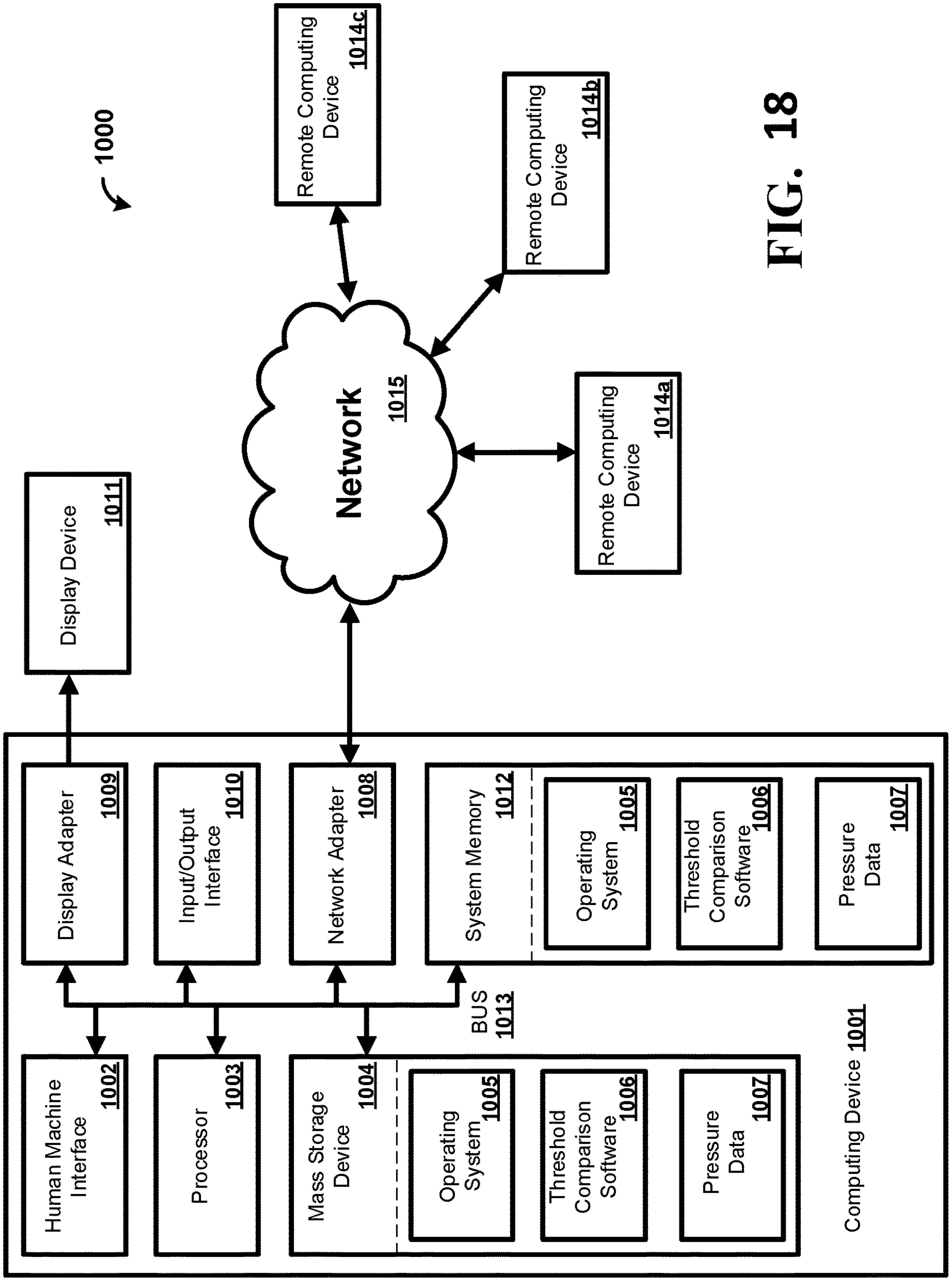
FIG. 18 shows an exemplary operating environment and computing device of the exemplary security screening system of FIG. 17.

The computing device 324 may be communicatively connected or coupled (e.g., wirelessly connected) to the medical device identifier 322. Optionally, in some aspects, the computing device 324 can be configured to receive an output from the medical device identifier 322 that is indicative of identifying information (e.g., a return electromagnetic waveform) received from the medical device. In these aspects, the computing device 324, through communication with the database 326, can be configured to determine an identity (e.g., make, model, etc.) and/or registration status of the medical device. In these aspects, it is contemplated that a display of the computing device 324 can be configured to display a graphical and/or textual output corresponding to the identity and/or registration status of the medical device. Additionally, or alternatively, the computing device 324 can be configured to cause display of such an output by another (e.g., remote) computing device that is in communication with computing device 324. Optionally, in other aspects, the medical device identifier 322 can be configured to determine the identity of the medical device as further disclosed herein, and the computing device 324 can be configured to receive an output from the medical device identifier 322 that is indicative of the determined identity of the medical device and/or a registration status of the identified medical device. In these aspects, it is contemplated that the user interface 44 of the medical device identifier 322 can be configured to display a graphical and/or textual output corresponding to the identity and/or registration status of the medical device. The computing device 324 may be a computer subsystem 28 as described herein. Alternatively, the computing device 324 may be a separate or different computing device. The computing device 324 may be a component of the medical device identifier 322. Optionally, the computing device 324 may be located within the medical device identifier 322. Alternatively, the computing device 324 may be located remotely from the medical device identifier 322. Optionally, FIG. 18 shows an operating environment 1000 including an exemplary configuration of a computing device 1001 having architecture in accordance with the computing device 324 of the security screening subsystem 320.

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as waveform data 1007 (i.e., data from signals received by the medical device identifier) and/or program modules such as operating system 1005 and template comparison software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically crasable programmable read-only memory (EEPROM), and the like.

Any number of program modules may be stored on the mass storage device 1004. An operating system 1005 and template comparison software 1006 may be stored on the mass storage device 1004. One or more of the operating system 1005 and template comparison software 1006 (or some combination thereof) may comprise program modules and the template comparison software 1006. The waveform data 1007 may also be stored on the mass storage device 1004. The waveform data 1007 may be stored in any of one or more databases known in the art. The databases may be centralized or distributed across multiple locations within the network 1015.

A user may enter commands and information into the computing device 1001 using an input device. Such input devices comprise, but are not limited to, a joystick, a touchscreen display, a keyboard, a pointing device (e.g., a computer mouse, remote control), a microphone, a scanner, tactile input devices such as gloves, and other body coverings, motion sensor, speech recognition, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014*a,b,c*. A remote computing device 1014*a,b,c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computing device 1001 and a remote computing device 1014*a,b,c* may be made using a network 1015, such as a local area network (LAN) and/or a general wide area network (WAN), or a Cloud-based network. Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014*a,b,c* can optionally have some or all of the components disclosed as being part of computing device 1001. In various further aspects, it is contemplated that some or all aspects of data processing described herein can be performed via cloud computing on one or more servers or other remote computing devices. Accordingly, at least a portion of the system 1000 can be configured with internet connectivity.

With reference back to FIG. 17, security screening subsystem 320 may include a database 326. The database 326 may store information (e.g., waveform information) associated with a plurality of registered medical devices. The information associated with a plurality of registered medical devices may include the manufacturer and/or model of registered medical devices. Additionally, the information associated with the plurality of registered medical devices can comprise a waveform template corresponding to each respective registered medical device of the plurality of registered medical devices. The plurality of registered medical devices may be a list of registered medical devices. The computing device 324 of the security screening subsystem 320 may be in communication (e.g., in wireless or wired communication) with the database 326. The database 326 may be accessed via the computing device 324, which can optionally be provided as a component of the medical device identifier 322. The computing device 324 may be configured to determine if the output received from the medical device identifier 322 corresponds to a registered medical device among the database's list of registered medical devices. More specifically, the computing device 324 may be configured to determine if the identity of the implanted medical device corresponds to a registered medical device among the list of registered medical devices. Alternatively, it is contemplated that the medical device identifier 322 can independently determine the identity and registration status of the medical device, and the computing device 324 can be configured to receive and/or display information indicative of the determined identity and/or registration status. The computing device 324 may provide an output indicative of the determination of whether the identity of the implanted medical device corresponds to a registered medical device.

In response to the medical device identifier 322 and/or computing device 324 determining that the identity of the implanted medical device corresponds to a registered medical device, the security screening subsystem 320 may be configured to grant the individual with the implanted medical device access to the secured area 310 through the access point 312. For example, in response to a determination that the implanted medical device corresponds to a registered medical device, the user interface 44 of the medical device identifier 322 and/or the display of the computing device 324 can be configured to provide a textual and/or graphical (e.g., color-coded) message indicating that the individual with the implanted medical device should be granted access to the secured area 310. In response to the message, the security guard/screener can allow the individual to enter the secured area. In some exemplary aspects, it is contemplated that the computing device 324 can be configured to automatically open an access door to allow entry of the individual in response to the computing device determining that the implanted medical device is a registered medical device. Alternatively, in response to the computing device 324 determining that the identity of the implanted medical device does not correspond to a registered medical device, the security screening subsystem 320 may be configured to deny access to the screened individual, or the security screening subsystem 320 may be configured to require additional screening. For example, in response to a determination that the implanted medical device does not correspond to a registered medical device, the user interface 44 of the medical device identifier 322 and/or the display of the computing device 324 can be configured to provide a textual and/or graphical (e.g., color-coded) message indicating that the individual with the implanted medical device should not be granted access to the secured area 310 and/or that further screening is required. In response to the message, the security guard/screener can prevent the individual from entering the secured area and/or direct the individual to an area where further screening can occur. In some exemplary aspects, it is contemplated that the computing device 324 can be configured to retain an access door in a closed position to prevent entry of the individual in response to the computing device determining that the implanted medical device is not a registered medical device.

Figure 19:
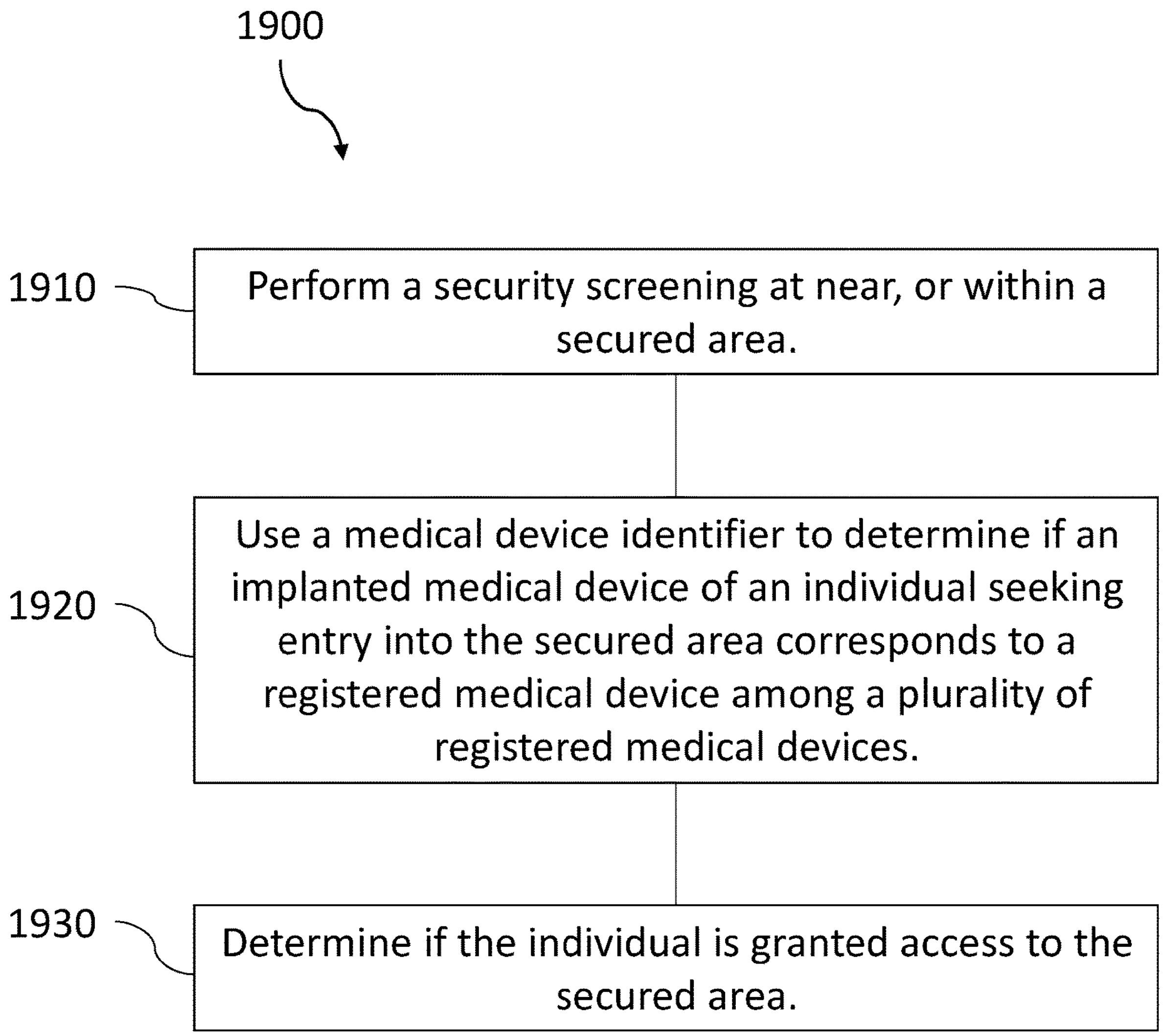
FIG. 19 is a flow chart of an exemplary security screening method having one or more features consistent with the present description.

FIG. 19 is a flowchart 1900 of a method having one or more features consistent with the present description. The operations described in the flowchart 1900 can be performed by one or more individuals and/or devices. In some variations, individual operations may be split into two or more operations. Similarly, multiple operations may be combined into a single operation.

At 1910, a security screening may be performed within a secured area. The secured arca may be located within any public space requiring security screening. Optionally, the secured arca may be located within an airport, a stadium, an arena, a theatre, an amusement park, a secured facility, an entertainment venue, a cruise ship or a public event space. The secured arca may have an access point. Individuals requesting access into the secured area may enter through the access point.

At 1920, a medical device identifier may be used to determine if an implanted medical device of an individual seeking entry into the secured area corresponds to a registered medical device among a list of registered devices. The medical device identifier may be positioned at or within the secured area. Optionally, the medical device identifier may be positioned at the access point of the secured area. The medical device identifier may be configured to provide an output indicative of an identity and/or registration status of an implanted medical device of an individual seeking entry into the secured area. The identity of the implanted medical device may include the manufacturer and/or model of the implanted medical device. The medical device identifier may communicate with a computing device. The computing device may be a component of the medical device identifier. The computing device may receive an output from the medical device identifier that is indicative of the identity of the implanted medical device. The medical device identifier and/or the computing device may be in communication with a database that stores information associated with a plurality of registered medical devices. The computing device may determine if the medical device corresponds to a registered medical device among the list of registered medical devices. The computing device may provide an output indicative of the determination of whether the identity of the medical device corresponds to a registered medical device.

At 1930, a determination may be made to grant or deny the individual access to the secured area. In response to the computing device determining that the identity of the implanted medical device corresponds to a registered medical device, the security screening subsystem may be configured to grant the individual with the implanted medical device access to the secured area. Alternatively, in response to the computing device determining that the identity of the implanted medical device does not correspond to a registered medical device, the security screening subsystem may be configured to deny access to the screened individual, or the security screening subsystem may be configured to require additional screening.

In one aspect, the method depicted in flowchart 1900 may be performed in less than 1 minute, less than 30 seconds, or less than 10 seconds. In one aspect, the operation may be performed in less than 20 seconds.

Figure 20:
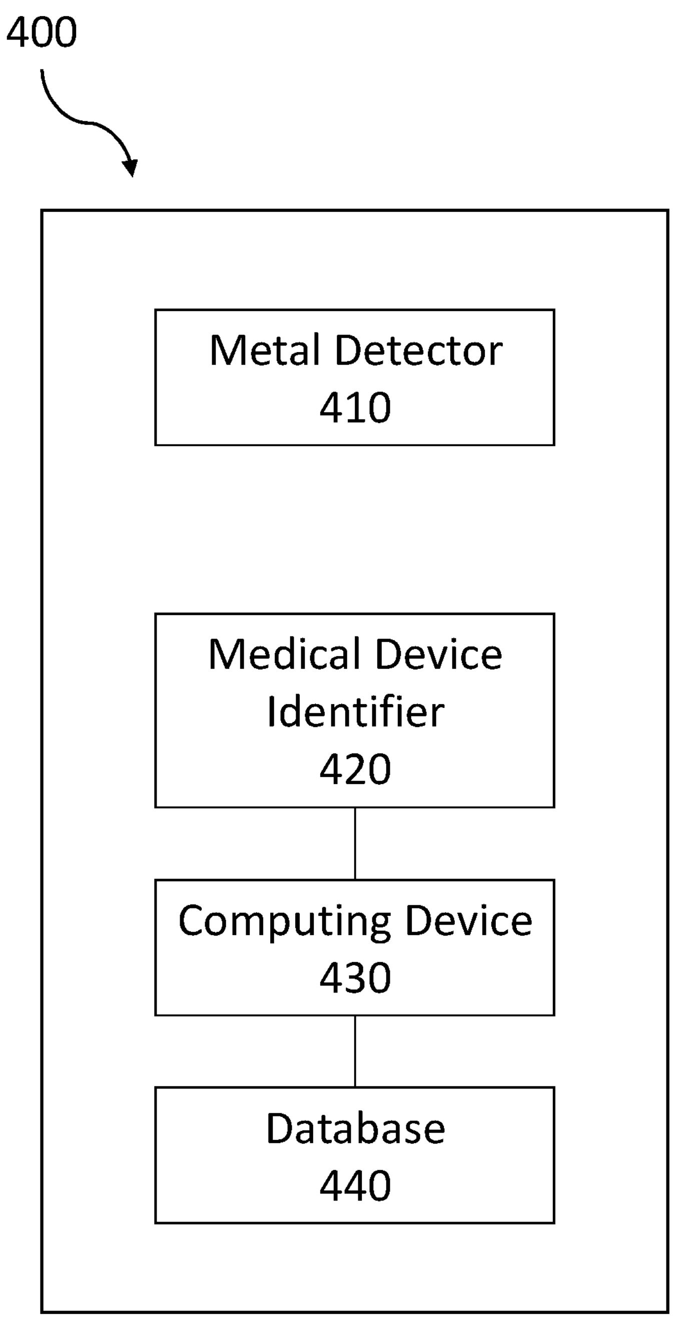
FIG. 20 shows an exemplary security device according to various aspects of the invention.

Disclosed herein with reference to FIG. 20 is an exemplary security device 400. In one aspect, the exemplary security device 400 may be used to perform the method depicted in the flowchart 1900 in FIG. 19 and described herein. The exemplary security device 400 may include a metal detector 410 and a medical device identifier 420. The metal detector 410 may be configured to identify a nearby presence of a metallic material. The metal detector 410 may be configured to provide an output indicative of the nearby presence of the metallic material. In one aspect, the metal detector 410 may produce an auditory and/or visual signal that a metallic material is present within a specified distance of the metal detector 410. For example, the metal detector 410 may produce a beeping sound when a metallic material is within 6 inches (or other threshold distance) of the metal detector 410. In another aspect, the metal detector 410 may produce an auditory and/or visual signal if there is no metallic material present near the metal detector 410. In yet another aspect, the metal detector 410 may produce a first auditory and/or visual signal if there is no metallic material present near the metal detector 410 and a second auditory and/or visual signal if there is metallic material present near the metal detector 410.

The medical device identifier 420 may include any and all combinations of the details, embodiments and/or aspects of the medical device identifiers 10, 322 described herein. The medical device identifier 420 may be communicatively connected to or coupled with a computing device 430. The computing device 430 may include any and all combinations of the details, embodiments and/or aspects of the computing device 324 described herein. Optionally, the computing device 430 may be located within the security device 400. Alternatively, the computing device 430 may be located remotely from the security device 400. The computing device 430 may communicate with a database 440. The database 440 may include any and all combinations of the details, embodiments and/or aspects of the database 326 described herein. The medical device identifier 420, along with the computing device 430 and database 440, may be used to determine whether an individual requesting access to a secure area has a medical implant, and if the individual has a medical implant, whether the medical implant is a registered medical device. The medical device identifier 420 may be configured to provide an output indicative of an identity and/or a registration status of an implanted medical device of an individual seeking entry into a secured arca. The identity of the implanted medical device may include the manufacturer and/or model of the implanted medical device. The medical device identifier 420 may use the methods described herein to determine the manufacturer and/or model of an implanted medical device of an individual requesting entry into the secured area. The computing device 430 may be configured to determine if the output received from the medical device identifier 420 corresponds to a registered medical device among the database's list of registered medical devices. More specifically, the computing device 430 may be configured to determine if the identity of the implanted medical device corresponds to a registered medical device among the list of registered medical devices. The computing device 430 may provide an output indicative of the determination of whether the identity of the implanted medical device corresponds to a registered medical device.

In one aspect, the security device 400 may be a handheld, portable security device, such as a security wand. In this aspect, an individual performing the security screening may hold the security device 400 by a grip or handle. Thus, in exemplary aspects, the security device 400 may include a shaft or body to which the medical device identifier 420 and the metal detector 410 are coupled (optionally, at respective locations spaced along a length of the shaft/body). The individual performing the security screening may scan an individual requesting access to a secure area by placing the security device 400 proximate to the individual requesting access. The individual performing the security screening may move the security device 400 around the individual's body to determine whether metallic material is detected on or in the individual requesting access to the secured area. If metallic material is detected, the security device 400 may be used to determine if there is a medical implant in the individual requesting access to the secure area, and if there is a medical implant, whether the medical implant is a registered medical device from the list of registered medical implants. In one aspect, the security device 400 may be used to first determine if there is an implanted medical device and whether the implanted medical device is a registered medical device, and then used to determine whether there is metallic material on or in the individual's body. Alternatively, the security device 400 may be used to simultaneously determine whether there is metallic material on or in the individual's body, and if there is an implanted medical device, whether the implant medical device is a registered medical implant. In another aspect, the security device 400 may be a walk through security device in which an individual requesting access to the secured area may pass through the security device. As the individual passes through the security device, the security device 400 may screen the individual passing through for metallic material and medical implants.

Figure 21:
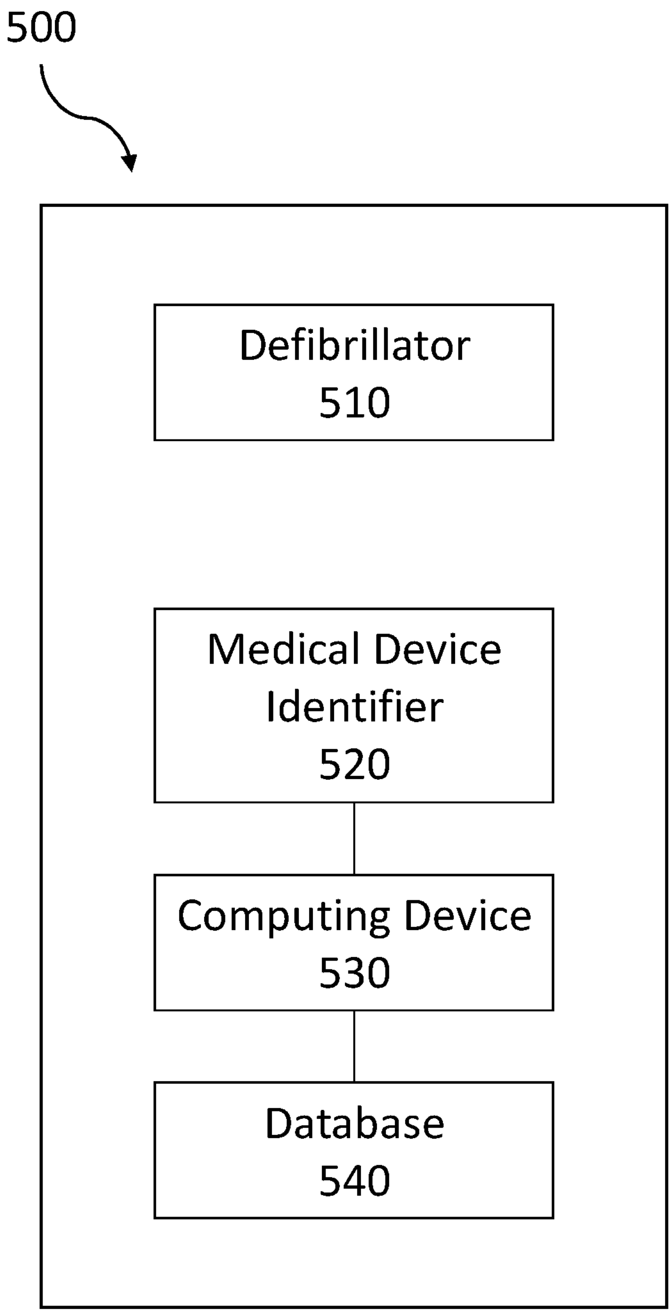
FIG. 21 shows an exemplary medical device according to various aspects of the invention.

FIG. 21 shows an exemplary screening and defibrillation device 500 according to various aspects. It is important to know whether an individual experiencing cardiac arrest has an implanted medical device, such as a pacemaker or implanted defibrillator, prior to operating an external defibrillator on the individual. The time between defibrillation cycles, the placement of the defibrillation pads, and/or the energy output of the external defibrillation equipment may need to be adjusted for individuals with implants to avoid damaging the medical implant. Thus, whether an individual has an implant and the type of implant should be verified prior to using external defibrillator equipment. Disclosed herein with reference to FIG. 21 is an exemplary screening and defibrillation device 500 that may be used to identify whether an individual has a medical implant and the type of medical implant prior to performing a defibrillation. The exemplary screening and defibrillation device 500 may include a defibrillator 510 and a medical device identifier 520. In one aspect, the defibrillator 510 may include a control box, a power source, delivery electrodes (pads), cables, and connectors. The defibrillator 510 may be configured to deliver electrical current to an individual's heart. The electrical current may be delivered to the individual's heart via the delivery electrodes coupled to pads that may contact the individual's chest.

The medical device identifier 520 may include any and all combinations of the details, embodiments and/or aspects of the medical device identifiers 10, 322 described herein. The medical device identifier 520 may be located at, near, or within the pads. Thus, in some aspects, the medical device identifier 520 and the defibrillator can be coupled or secured to a common shaft/body or housing. Alternatively, the medical device identifier 520 may be a separate instrument connected or coupled to the defibrillator 510. The medical device identifier 520 may communicate with a computing device 530. The computing device 530 may include any and all combinations of the details, embodiments and/or aspects of the computing device 324 described herein. Optionally, the computing device 530 may be located within the screening and defibrillation device 500. Alternatively, the computing device 530 may be located remotely from the screening and defibrillation device 500. The computing device 530 may communicate with a database 540. The database 540 may include any and all combinations of the details, embodiments and/or aspects of the database 326 described herein. The medical device identifier 520, along with the computing device 530 and database 540, may be used to determine whether an individual requiring the use of a defibrillator has a medical implant, and if the individual has a medical implant, the type, such as manufacturer and/or model, of medical implant. The medical device identifier 520 may use the methods described herein to determine the manufacturer and/or model of an implanted medical device of the individual in cardiac arrest. In operation, the screening and defibrillation device 500 may be used to identify a medical implant within an individual experiencing cardiac arrest and to perform defibrillation on the individual.

Although the foregoing invention has been described in some detail by way of illustration and example for purposes of clarity of understanding, certain changes and modifications may be practiced within the scope of the appended claims.

What is claimed is:

1. A system comprising:

a secured area; and a security screening subsystem having:

a medical device identifier positioned at, near or within the secured area, wherein the medical device identifier is configured to provide an output indicative of identifying information associated with an implanted medical device of an individual seeking entry into the secured area;

a computing device configured to receive the output from the medical device identifier; and a database storing information associated with a plurality of registered medical devices, wherein the information stored by the database comprises a plurality of digital templates corresponding to different medical devices of the plurality of registered medical devices, wherein the computing device of the security screening subsystem is in communication with the database and configured to:

determine, based on a comparison of the identifying information with the plurality of digital templates stored in the database, a manufacturer, a model, or a registration status of the implanted medical device to determine if the identifying information associated with the implanted medical device corresponds to a registered medical device among the plurality of registered medical devices; and provide an output indicative of the determination of whether the identity of the implanted medical device corresponds to a registered medical device.

2. The system of claim 1, wherein the secured area is located within an airport, a stadium, an arena, a theatre, an amusement park, a secured facility, an entertainment venue, a cruise ship or a public event space.

3. The system of claim 1, wherein the medical device identifier is a portable, handheld device.

4. The system of claim 1, wherein the medical device identifier is positioned at an access point, and wherein in response to the computing device determining that the identifying information associated with the implanted medical device corresponds to a registered medical device, the security screening subsystem is configured to grant the individual access to the secured area through the access point.

5. The system of claim 1, wherein the computing device is a component of the medical device identifier.

6. The system of claim 1, wherein the implanted medical device is a cardiac implant.

7. The system of claim 1, wherein the medical device identifier does not emit X-rays.

8. The system of claim 1, wherein the medical device identifier comprises:

a coil;

a digital-to-analog converter coupled to the computing device;

drive circuitry coupled to the coil and the digital-to-analog converter; and receiver circuitry coupled to the coil and the computing device;

wherein the computing device is configured to cause the medical device identifier to:

sequentially excite the coil, via the digital-to-analog converter and the drive circuitry, to generate electromagnetic waveforms corresponding to one or more digitized waveforms; and receive and digitize, via the coil and the receiver circuitry, a returned electromagnetic waveform transmitted from the implanted medical device in response to the electromagnetic waveforms generated by the medical device identifier, wherein the computing device is configured to compare the digitized returned electromagnetic waveform with the plurality of digital templates to determine whether the digitized electromagnetic waveform corresponds to a digital template associated with a medical device of the plurality of registered medical devices.

9. A method comprising:

performing a security screening within a secured area, the security screening comprising:

using a medical device identifier to determine, based on a comparison of identifying information associated with the implanted medical device with a plurality of digital templates corresponding to different registered medical devices, if an implanted medical device of an individual seeking entry into the secured area corresponds to a registered medical device among a list of registered medical devices, wherein the medical device identifier communicates with a computing device, wherein the computing device is in communication with a database that stores information associated with a plurality of registered medical devices, and wherein the computing device is configured to:

receive an output from the medical device identifier that is indicative of identifying information associated with the implanted medical device;

determine if the identifying information associated with the implanted medical device corresponds to a registered medical device among the list of registered medical devices by determining a manufacturer, a model, or a registration status of the implanted medical device; and provide an output indicative of the determination of whether the identifying information associated with the implanted medical device corresponds to a registered medical device.

10. The method of claim 9, wherein the medical device identifier is positioned at an access point to the secured area, and wherein in response to the computing device determining that the identifying information associated with the implanted medical device corresponds to a registered device, the security screening subsystem grants the individual access to the secured area through the access point.

11. The method of claim 9, wherein the medical device identifier comprises:

a coil;

a digital-to-analog converter coupled to the computing device;

drive circuitry coupled to the coil and the digital-to-analog converter; and receiver circuitry coupled to the coil and the computing device, wherein the computing device causes the medical device identifier to:

sequentially excite the coil, via the digital-to-analog converter and the drive circuitry, to generate electromagnetic waveforms corresponding to one or more digitized waveforms; and receive and digitize, via the coil and the receiver circuitry, a returned electromagnetic waveform transmitted from the implanted medical device in response to the electromagnetic waveforms generated by the medical device identifier, and wherein the computing device compares the digitized returned electromagnetic waveform with the plurality of digital templates to determine whether the digitized electromagnetic waveform corresponds to a digital template associated with a medical device of the plurality of registered medical devices.

12. A security device comprising:

a device body;

a metal detector coupled to the body and configured to identify a nearby presence of a metallic material and to provide an output indicative of the nearby presence of the metallic material; and a medical device identifier coupled to the body and configured to provide an output indicative of identifying information associated with an implanted medical device of an individual seeking entry into a secured area;

a computing device configured to receive the output from the medical device identifier; and a database storing information associated with a plurality of registered medical devices, wherein the information stored by the database comprises a plurality of digital templates corresponding to different medical devices of the plurality of registered medical devices, wherein the computing device is in communication with the database and configured to:

determine, based on a comparison of the identifying information with the plurality of digital templates, if the identifying information associated with the implanted medical device corresponds to a registered medical device among the list of registered medical devices by determining a manufacturer, a model, or a registration status of the implanted medical device; and provide an output indicative of the determination of whether the identifying information associated with the implanted medical device corresponds to a registered medical device.

13. The device of claim 12, wherein the medical device identifier comprises:

a coil;

a digital-to-analog converter coupled to the computing device;

drive circuitry coupled to the coil and the digital-to-analog converter; and receiver circuitry coupled to the coil and the computing device, wherein the computing device causes the medical device identifier to:

sequentially excite the coil, via the digital-to-analog converter and the drive circuitry, to generate electromagnetic waveforms corresponding to one or more digitized waveforms; and receive and digitize, via the coil and the receiver circuitry, a returned electromagnetic waveform transmitted from the implanted medical device in response to the electromagnetic waveforms generated by the medical device identifier, and wherein the computing device compares the digitized returned electromagnetic waveform with the plurality of digital templates to determine whether the digitized electromagnetic waveform corresponds to a digital template associated with a medical device of the plurality of registered medical devices.

14. A screening and defibrillation device comprising:

a device body;

a defibrillator coupled to the device body and configured to deliver electrical current to an individual's heart; and a medical device identifier coupled to the device body and configured to provide an output indicative of identifying information associated with an implanted medical device of the individual;

a computing device configured to receive the output from the medical device identifier; and a database storing information associated with a plurality of registered medical devices, wherein the information stored by the database comprises a plurality of digital templates corresponding to different medical devices of the plurality of registered medical devices, wherein the computing device is in communication with the database and configured to:

determine, based on a comparison of the identifying information with the plurality of digital templates stored in the database, a manufacturer, a model, or a registration status of the implanted medical device to determine if the identifying information associated with the implanted medical device corresponds to a registered medical device among the plurality of registered medical devices; and provide an output indicative of the determination of whether the identifying information associated with the implanted medical device corresponds to a registered medical device.

15. The device of claim 14, wherein the medical device identifier comprises:

a coil;

a digital-to-analog converter coupled to the computing device;

drive circuitry coupled to the coil and the digital-to-analog converter; and receiver circuitry coupled to the coil and the computing device, wherein the computing device causes the medical device identifier to:

sequentially excite the coil, via the digital-to-analog converter and the drive circuitry, to generate electromagnetic waveforms corresponding to one or more digitized waveforms; and receive and digitize, via the coil and the receiver circuitry, a returned electromagnetic waveform transmitted from the implanted medical device in response to the electromagnetic waveforms generated by the medical device identifier, and wherein the computing device compares the digitized returned electromagnetic waveform with the plurality of digital templates to determine whether the digitized electromagnetic waveform corresponds to a digital template associated with a medical device of the plurality of registered medical devices.

* * * * *